United States Patent [19]

Kanatani et al.

[11] Patent Number: 5,414,443
[45] Date of Patent: May 9, 1995

[54] DRIVE DEVICE FOR DRIVING A MATRIX-TYPE LCD APPARATUS

[75] Inventors: Yoshiharu Kanatani, Nara; Hirofumi Fukuoka, Osaka; Shigeyuki Uehira, Nara, all of Japan

[73] Assignee: Sharp Kabushiki Kaisha, Osaka, Japan

[21] Appl. No.: 944,025

[22] Filed: Sep. 11, 1992

Related U.S. Application Data

[63] Continuation of Ser. No. 504,353, Apr. 4, 1990, abandoned.

[30] Foreign Application Priority Data

| Apr. 4, 1989 | [JP] | Japan | 1-85526 |
| Sep. 1, 1989 | [JP] | Japan | 1-227943 |
| Sep. 1, 1989 | [JP] | Japan | 1-227944 |
| Dec. 6, 1989 | [JP] | Japan | 1-318269 |

[51] Int. Cl.⁶ ............................. G09G 3/36
[52] U.S. Cl. ............................. 345/95; 345/89
[58] Field of Search ............ 350/332, 333; 340/793, 340/784, 811, 767, 805, 781; 358/230, 236, 241; 345/89, 147, 94-96

[56] References Cited

U.S. PATENT DOCUMENTS

| 4,100,579 | 7/1978 | Ernstoff | 340/784 |
| 4,319,237 | 3/1982 | Matsuo et al. | 340/784 |
| 4,393,380 | 7/1983 | Hosokawa et al. | 340/784 |
| 4,455,576 | 6/1984 | Hoshi | 358/230 |
| 4,635,127 | 1/1987 | Togashi | 358/241 |
| 4,652,872 | 3/1987 | Fujita | 340/781 |
| 4,736,137 | 4/1988 | Ohwada et al. | |
| 4,921,334 | 5/1990 | Akodes | 350/332 |
| 4,975,691 | 12/1990 | Lee | 340/781 |
| 5,061,920 | 10/1991 | Nelson | 345/89 |

FOREIGN PATENT DOCUMENTS

| 0221307 | 5/1987 | European Pat. Off. |
| 0300755 | 1/1989 | European Pat. Off. |
| 2449317 | 9/1980 | France |
| 2164190 | 3/1986 | United Kingdom |
| 2188471 | 9/1987 | United Kingdom |

*Primary Examiner*—Jeffery Brier
*Attorney, Agent, or Firm*—Morrison & Forester

[57] ABSTRACT

A drive device for driving a matrix-type LCD apparatus comprises a voltage signal supply means for outputting a plurality of voltage signals with different levels. The voltage signals have alternately positive and negative levels with respect to an AC reference voltage applied to a counter-electrode of the LCD apparatus. The AC reference voltage is approximately 180° out-of-phase with the voltage signals. The drive device also comprises a signal electrode drive means which selects one of the voltage signals depending upon an input digital video signal, and which supplies the selected voltage signal to a signal electrode of the LCD apparatus.

10 Claims, 25 Drawing Sheets

FIG. 4(a)
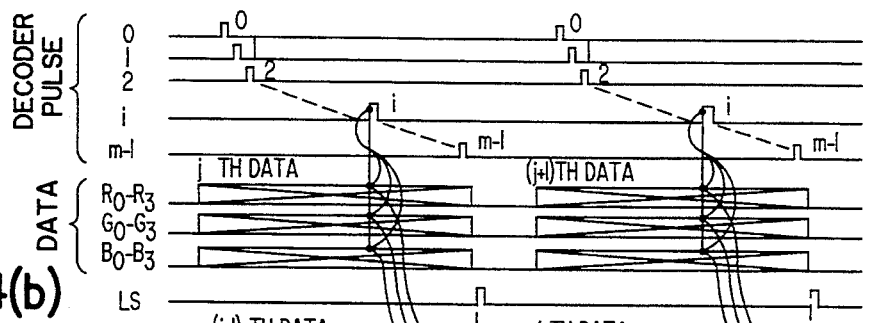
FIG. 4(b)
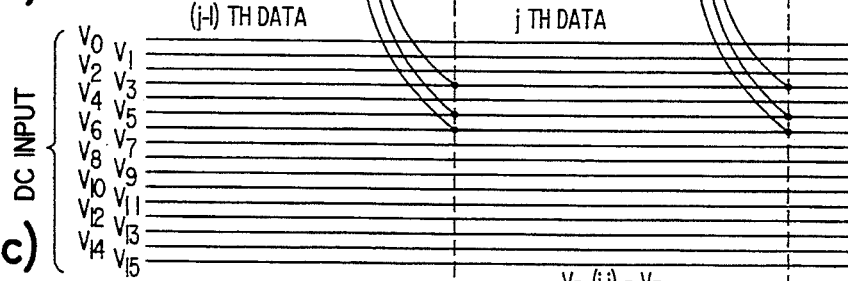
FIG. 4(c)
FIG. 4(d)
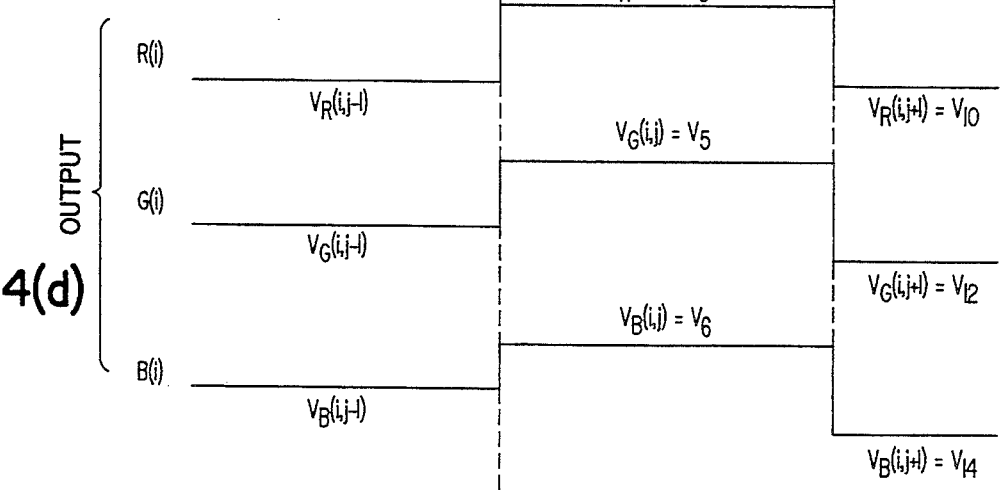

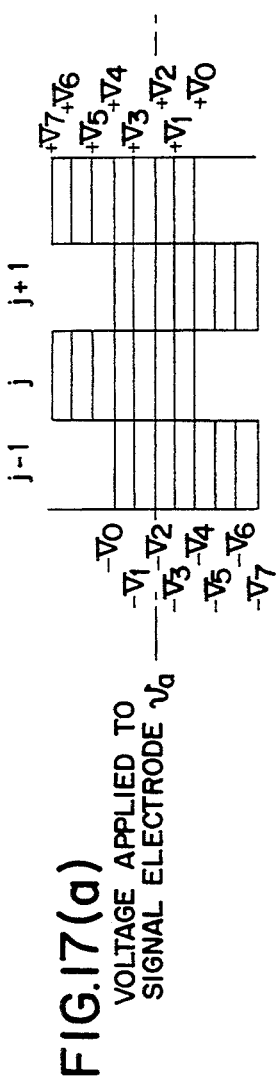
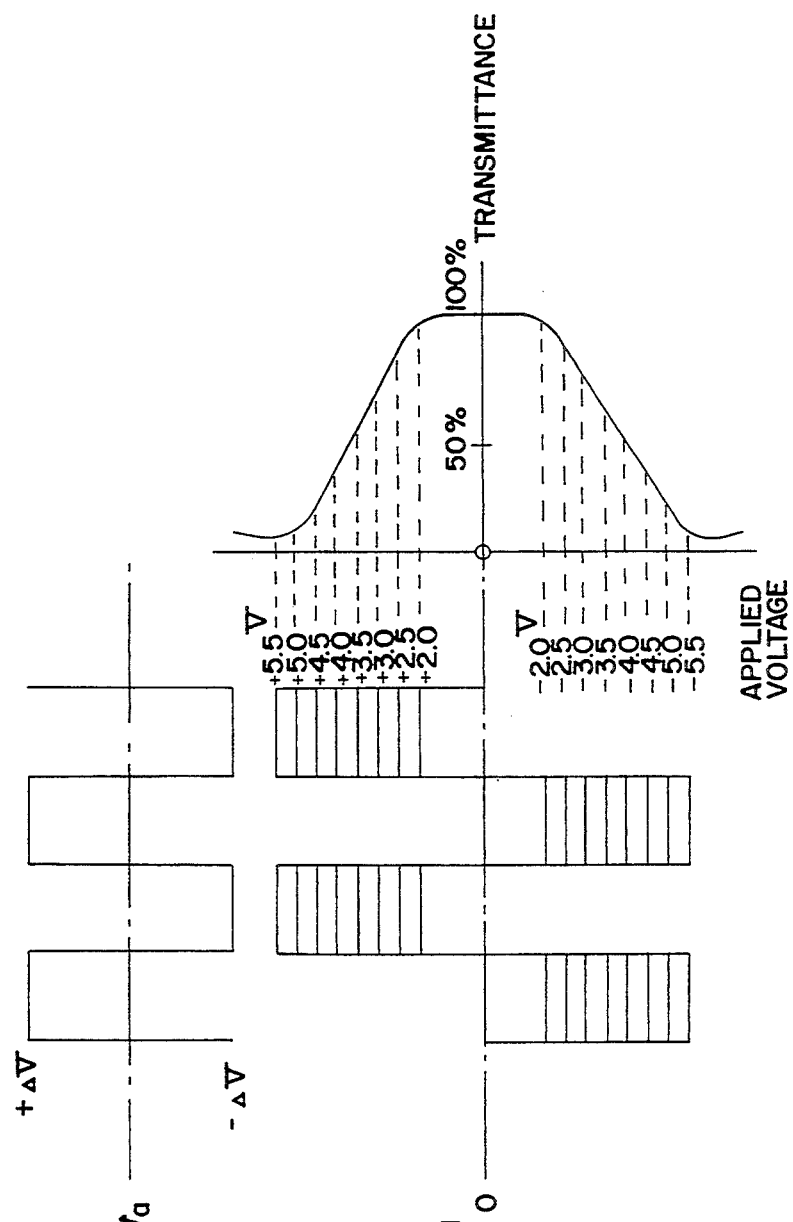
FIG.17(a) VOLTAGE APPLIED TO SIGNAL ELECTRODE $v_a$
FIG.17(b) VOLTAGE $v_c$ APPLIED TO COUNTER ELECTRODE $v_a$
FIG.17(c) VOLTAGE AS SEEN FROM COUNTER ELECTRODE

DRIVE DEVICE FOR DRIVING A MATRIX-TYPE LCD APPARATUS

This application is a continuation of application Ser. No. 504,353, filed Apr. 4, 1990 now abandoned.

BACKGROUND OF THE INVENTION

1. Field of the Invention

This invention relates to a drive device for driving a display apparatus and a method of driving a display apparatus, and more particularly to a drive device for a display apparatus which is capable of gray-scale display by means of amplitude modulation and also to a method of driving such a display apparatus. In this specification, a display apparatus using a matrix liquid crystal display apparatus will be described as a typical example of a display apparatus, but this invention can also be applied to drive circuits for other types of display apparatuses such as electroluminescent (EL) display apparatus and plasma display apparatus.

2. Description of the Prior Art

FIG. 20 shows a matrix liquid crystal display apparatus of the prior art. The matrix liquid crystal display of FIG. 20 employs a TFT liquid crystal panel 100 comprising thin-film transistors (TFT) as the switching elements for driving pixel electrodes 103. The TFT liquid crystal panel 100 further comprises n (numbered from 0 to n-1) scanning electrodes 101 positioned parallel to each other and m (numbered from 0 to m-1) signal electrodes 102 positioned parallel to each other and perpendicularly intersecting the scanning electrodes 101. TFTs 104 for driving the pixel electrodes 103 are located in the vicinity of the intersections of the scanning electrodes 101 and the signal electrodes 102. One horizontal scanning line is composed of m pixel electrodes 103 arranged in a row. Counter electrodes 105 which are respectively opposite to the pixel electrodes 103 are formed. A plurality of counter electrodes are shown in FIG. 20, but actually they are consist of one conductive layer formed in common to all of the pixel electrodes 103. A fixed voltage $v_c$ is impressed on the counter electrodes 105.

The TFT liquid crystal panel 100 is driven by a drive device containing a source driver 200 and gate driver 300. The source driver 200 and gate driver 300 are connected to the signal electrodes 102 and the scanning electrodes 101, respectively, of the TFT panel 100. The source driver 200 samples an input analog video signal or video signal, and holds it. The held signal is supplied to the signal electrodes 102. The gate driver 300 outputs scanning pulses to the scanning electrodes 101 in sequence. The timing signal and other signals input to the gate driver 300 and source driver 200 are supplied from a control circuit 400.

With reference to FIG. 21, the source driver 200 will be described in more detail. The source driver 200 comprises a shift register 210, sample and hold circuits 220 and output buffers 230. In the shift register 210, shift pulses input from the control circuit 400 are shifted in accordance with the shift clock, and sampling pulses are output sequentially to lines $B_1$, $B_2$, ..., $B_i$, ..., $B_m$. In conjunction with this, analog switches ASW1(1), ..., ASW1(i), ..., ASW1(m) become closed in sequence, and sampling capacitors 221 are charged in sequence up to the instantaneous amplitude v(i, j) of the input analog video signal. Here, v(i, j) is the instantaneous amplitude of an analog video signal to be written to the pixel electrode 103 corresponding to the intersection of the ith signal electrode and jhe scanning electrode of the TFT liquid crystal panel 100. In this way, after video signals of one horizontal scanning period are sampled by the sample and hold circuit 220, an output pulse OE is input, and the video signals are transferred from the sampling capacitors 221 to the holding capacitors 222. The video signal held by the holding capacitors 222 are output to the signal electrodes 102 via the output buffers 230.

FIG. 22 diagrammatically shows waveforms of the input and output signals in the source driver 200. In FIG. 22, $v(C_{SPL}(i))$, $v(C_H(i))$ and $v_S(i)$ denote the voltage of the ith sampling capacitor 221, the voltage of the ith holding capacitor 222 and the output voltage of the ith output buffer 230, respectively.

FIG. 23 shows another matrix liquid crystal display device of the prior art in which a TFT liquid crystal panel 100 further comprises supplemental capacitance electrodes 106. The equivalent circuit of the pixels in the TFT liquid crystal panel 100 shown in FIG. 23 is illustrated in FIG. 24. As shown in FIG. 24, in addition to the pixel capacitance $C_{LC}$ formed between the pixel electrode 103 and the counter electrode 105, a supplemental capacitance $C_S$ is formed between the pixel electrode 103 and the supplemental capacitance electrode 106. In the TFT liquid crystal panel 100, the waveform of the AC signal applied to a liquid crystal pixel is asymmetric even when the signal electrodes 102 are AC-driven, and this results in the formation of polarized electric fields in the liquid crystal pixels, which results in the deterioration of the liquid crystal pixels and reduces their reliability. The addition of a supplemental capacitance is aimed at improving this kind of problem and reducing flicker.

Generally, one of the electrodes of the supplemental capacitance $C_S$ is formed by a part of the pixel electrode 103. The other electrode (i.e., supplemental capacitance electrodes 106) of the supplemental capacitance $C_S$ may be connected by either of the following two methods.

In the first method, as shown in FIG. 23, the supplemental capacitance electrode 106 corresponding to the jth scanning electrode 101 is connected electrically to the adjacent (j−1)th scanning electrode 101. The supplemental capacitance electrode 106 corresponding to the 0th (j=0) scanning electrode 101 is connected to the counter electrode 105. This method is referred to as the CS on-gate method.

In the second method, as shown in FIG. 25, the supplemental capacitance electrode 106 is connected electrically to the counter electrode 105. In this case, the voltage $v_x$ of the supplemental capacitance electrode 106 is equal to the voltage $v_c$ of the counter electrode 105.

In the second method, fetch bus lines for connecting the supplemental capacitance electrodes 106 to the counter electrodes 105 must be wired parallel to the scanning electrodes 101, thus causing a problem with reduced pixel areas. In the first method, however, such fetch bus lines can be realized by the gate electrodes, so this method is advantageous with respect to the improvement of pixel areas.

The so-called "analog video signal sampling method" drive circuits described above present the following problems (1) to (4) when attempts are made to increase the size or improve the resolution of a display panel such as the above-mentioned TFT liquid crystal panel 100.

(1) In a drive device which samples the amplitude of an analog video signal, the accuracy in the amplitude v(i, j) of a sampled video signal is determined by the time constant established by the on-resistance $R_{ON}$ of the closed analog switch ASW1(i) and the capacitance $C_{SPL}$ of the sampling capacitor 221. Hence, the above-mentioned time constant must be selected so that the frequency band of the video signal is not narrowed by the sampling. More specifically, assuming the frequency at which the signal level drops by 3 dB is expressed as f(−3 dB) Hz in the frequency characteristic of the input analog video signal, then the condition in the following equation must be satisfied.

$$\frac{0.35}{2.2 \times R_{ON} \times C_{SPL}} > > f(-3 \text{ dB})$$

As the capacity and resolution of display panels (TFT liquid crystal panel 100) are increased, the frequency band becomes wider, which requires faster sampling, so a low $R_{ON}$ and small $C_{SPL}$ are required to satisfy the equation above.

The charges in the sampling capacitors 221 are distributed to the holding capacitors 222 by the output pulse OE, and the voltage of the holding capacitor 222 of the capacitance $C_H$ becomes as follows.

$$v(C_H(i)) = v(i,j) \frac{C_{SPL}(i)}{C_{SPL}(i) + C_H(i)}$$

$$= v(i,j) \frac{1}{1 + \frac{C_H(i)}{C_{SPL}(i)}}$$

$$< v(i,j)$$

When $C_H(i) < < C_{SPL}(i)$, therefore, $v(C_H(i))$ is approximately equal to v(i, j). It can be seen that there is a limit to the minimization of the capacitance $C_{SPL}$ in order to minimize amplitude attenuation due to charge distribution from the sampling capacitors 221 to the holding capacitors 222. Further, in order to suppress deterioration or irregularity of the input/output linearity due to dispersion during production in the on-resistance $R_{ON}$ as well as in the capacitances $C_{SPL}$ and $C_H$, the capacitance $C_{SPL}$ cannot be made very small. As this indicates, there is a limit to the minimization of the capacitance of the sampling capacitors 221, so it is difficult to greatly widen the frequency band of the input video signal. This problem becomes an obstacle to increasing the capacity of a display panel.

(2) Analog video signals are supplied to the source driver 200 via the bus line as shown in FIG. 21, and as the capacity and resolution of a display panel are increased, the frequency band of the video signal becomes wider and the distribution capacity of the bus line increases. This results in the necessity of a wideband amplifier in the circuit supplying video signals, and increases the cost of production.

(3) When bus lines for supplying multiple analog video signals are arranged in a color display apparatus in which RGB video signals are used, as the capacity and resolution of the display panel are increased, the above-mentioned wideband amplifier is required to have extremely high signal quality in that there can be no phase differences between the multiple video signals and no dispersion in the amplitude characteristics or frequency characteristics.

(4) Unlike the displaying in a CRT, in drive circuits for matrix display devices, analog video signals are sampled according to a clock signal and displayed in pixels arranged in a matrix. Because delays in the drive device including delays in the bus lines cannot be avoided, it is extremely difficult to accurately establish the sampling position for the analog video signals. Particularly, when displaying on a matrix display apparatus a computer graphic image in which the relationship between video signals and pixel addresses is clearly defined, though in theory it should be possible to perfectly reproduce computer-generated images on the display panel, shift in the image display position, bleeding of the image, etc., due to delays in the drive system and deterioration of the frequency characteristics cannot be avoided in drive circuits using an analog video signal sampling method of the prior art.

Further, the operating voltage of the source driver in a drive device of the prior art presents problems concerning source drivers of the prior art which comprise shift registers, counters and other logic circuits which operate on low voltages, and sample and hold circuits, level shifters, output buffers and other intermediate-voltage circuits which operate at voltages higher than the logic circuits. The integration of such circuits with different operating voltages into a monolithic LSI device requires design rules and production processes suitable for the intermediate-voltage circuits. In the prior art, consequently, the increase of the operating speed of a logic circuitry is hindered, and it is difficult to attain high levels of large-scale integration, reduce costs and achieve low power consumption.

SUMMARY OF THE INVENTION

According to the invention, a drive device for driving a display apparatus having a display unit, said display unit including a plurality of signal electrodes arranged in juxtaposition is provided, which overcomes the above-discussed and numerous other disadvantages and deficiencies of the prior art, the drive device comprises a signal electrode drive means for converting an input digital video signal into a voltage signal having one of predetermined plural levels, and supplying said voltage signal to one of said signal electrodes.

In a preferred embodiment, the signal electrode drive means comprises: a video signal memory means for storing said input digital video signals; a data decoding means for decoding the information contained in said digital video signals which are stored in said memory means; a voltage signal supply means for outputting a plurality of voltage signals with different levels; and a selection means for selecting one of said plurality of voltage signals in accordance with the output of said data decoding means.

In a preferred embodiment, the video signal memory means stores said digital video signals for at least one horizontal scanning period.

In a preferred embodiment, the voltage signals are DC voltage signals.

According to the invention, a drive device for driving a display apparatus having a display unit, said display unit including a plurality of signal electrodes arranged in juxtaposition and at least one counter electrode is provided. The drive device comprises: a voltage signal supply means for outputting a plurality of voltage signals with different levels, said plurality of voltage signals having alternately positive and negative levels with respect to the level of the voltage applied to said counter electrode; and a signal electrode drive means for selecting one of said plurality of voltage signals in accordance with an input digital video signal, and supplying said selected voltage signal to one of said signal electrodes.

In a preferred embodiment, each of the periods of said positive level and periods of said negative level corresponds to one horizontal scanning period, and the relationship between the levels in horizontal scanning periods during one frame is inverted in corresponding horizontal scanning periods during the frame following said one frame.

In a preferred embodiment, the signal electrode drive means comprises: a video signal memory means for storing said input digital video signals; a data decoding means for decoding the information contained in said digital video signals which are stored in said memory means; and a selection means for selecting one of said plurality of voltage signals in accordance with the output of said data decoding means, and supplying said selected voltage signal to one of said signal electrodes.

According to the invention, a drive device for driving a display apparatus having a display unit, said display unit including: a plurality of signal electrodes arranged in juxtaposition; a plurality of scanning electrodes intersecting said signal electrodes; a plurality of pixel electrodes which are disposed respectively at the intersections of said signal electrodes and said scanning electrodes; at least one counter electrode opposing said pixel electrodes; and supplemental capacitance electrodes for forming capacitors in cooperation with said pixel electrodes is provided. The drive comprises: a voltage apply means for applying an AC voltage to said counter electrode, a signal electrode drive means for AC-driving said signal electrodes, the level of said AC voltage varying and being either in-phase or about 180 degree out-of-phase with respect to the AC voltage which is applied to the signal electrodes, and a supplemental capacitance electrode drive means for driving said supplemental electrodes, the drive of said supplemental electrodes being in phase of said AC voltage.

In a preferred embodiment, the phases of said AC voltage and said AC-drive of said signal electrodes are substantially reversed.

In a preferred embodiment, the drive device further comprises a voltage signal supply means for outputting a plurality of voltage signals with different levels, said plurality of voltage signals having alternately positive and negative levels with respect to said reference voltage, and said signal electrode drive means comprises a supply means for selecting one of said plurality of voltage signals in accordance with an input digital video signal, and supplying said selected voltage signal to one of said signal electrodes.

In a preferred embodiment, the supplemental capacitance electrodes correspond respectively to predetermined ones of said scanning electrodes, and each of said supplemental capacitance electrodes is electrically connected to said scanning electrodes other than said predetermined scanning electrodes.

In a preferred embodiment, the supplemental capacitance electrodes are electrically connected to said counter electrode.

In a preferred embodiment, the drive device further comprises a scanning electrode drive means for driving said scanning electrodes, said scanning electrode drive means operating at a floating state.

In a preferred embodiment, the signal electrode drive means is powered by a single power source.

According to the invention, a method of driving a display apparatus having a display unit, said display unit including a plurality of signal electrodes arranged in juxtaposition, said display apparatus comprising a signal electrode drive means for converting input digital video signals into voltage signals each having one of plural levels, and supplying said voltage signal to one of said signal electrodes is provided. The method comprises: supplying in each frame, when obtaining a standard gray-scale corresponding to one of said voltage signals, a digital video signal which is to be converted to a voltage signal corresponding to said standard gray-scale, to said signal electrode drive means as the input digital video signal corresponding to one signal electrode; and supplying in plural frames, when obtaining an intermediate gray-scale corresponding to none of said voltage signals, a plurality of digital video signals with different levels which are to be converted to different ones of said voltage signals, to said signal electrode drive means as the input digital video signal corresponding to one signal electrode, the ratios of said plurality of digital video signals depending to said intermediate gray-scale.

In a preferred embodiment, the voltage signals are two voltage signals the levels of which are adjacent to each other, the level of the first one of said two voltage signals being lower than the voltage level corresponding to said intermediate gray-scale, the level of the second one of said two voltage signals being higher than the voltage level corresponding to said intermediate gray-scale.

Thus, the invention described herein makes possible the objectives of:

(1) providing a drive device for a display apparatus in which deterioration of the frequency characteristics of video signals due to the sampling time constant can be avoided;

(2) providing a drive device for a display apparatus in which amplitude attenuation due to the charge distribution between sampling capacitors and holding capacitors does not occur;

(3) providing a drive device for a display apparatus in which delay in time due to the dispersion of circuits constants of circuit elements does not occur;

(4) providing a drive device for a display apparatus in which processes are mainly conducted on digital signals, thereby enabling operations of various portions to be thoroughly synchronized;

(5) providing a drive device for a display apparatus in which positional shift and bleeding of an image due to signal delay can be suppressed, thus greatly improving the accuracy and quality of display;

(6) providing a drive device for a display apparatus which can be produced at a low cost;

(7) providing a drive device for a display apparatus in which the number of bits of input digital video signals necessary to obtain a certain number of gray-scale levels can be reduced, thereby reducing the number of bus lines for inputting video signals;

(8) providing a drive device for a display apparatus in which the amplitude of signals applied to signal electrodes can be reduced so that the operating voltages of intermediate-voltage circuits for driving signal electrodes are lowered;

(9) providing a drive device for a display apparatus in which the high speed operation, higher integration, lower production cost, and lower power consumption of the signal electrode driving system can be achieved;

(10) providing a drive device for a display apparatus in which the signal electrode driving system can be operated by a single power source;

(11) providing a drive device for a display apparatus in which video signals of a higher bit rate can be processed; and

(12) providing a method of driving a display apparatus by which the gray-scale display can be realized without being restricted by a prefixed number of voltage level signals.

BRIEF DESCRIPTION OF THE DRAWINGS

This invention may be better understood and its numerous objects and advantages will become apparent to those skilled in the art by reference to the accompanying drawings as follows:

FIG. 4 is a timing chart showing the operation of the device shown in FIG. 1.

FIGS. 17–19 show typical waveforms of drive voltages in the device shown in FIG. 12.

DESCRIPTION OF THE PREFERRED EMBODIMENTS

EXAMPLE 1

Figure 1:
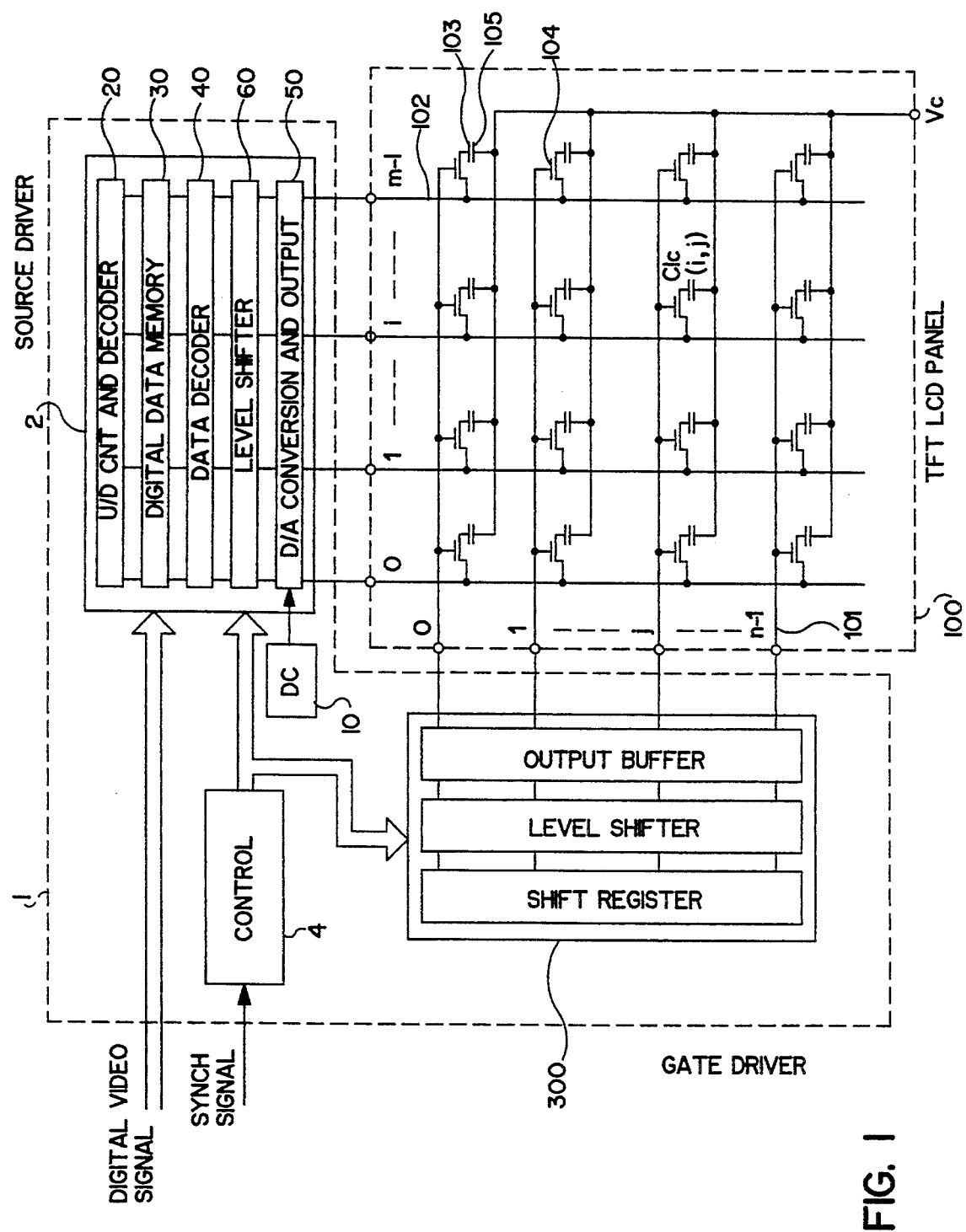
FIG. 1 is a block diagram of a matrix liquid crystal display apparatus using a drive device of the invention.
Figure 20:
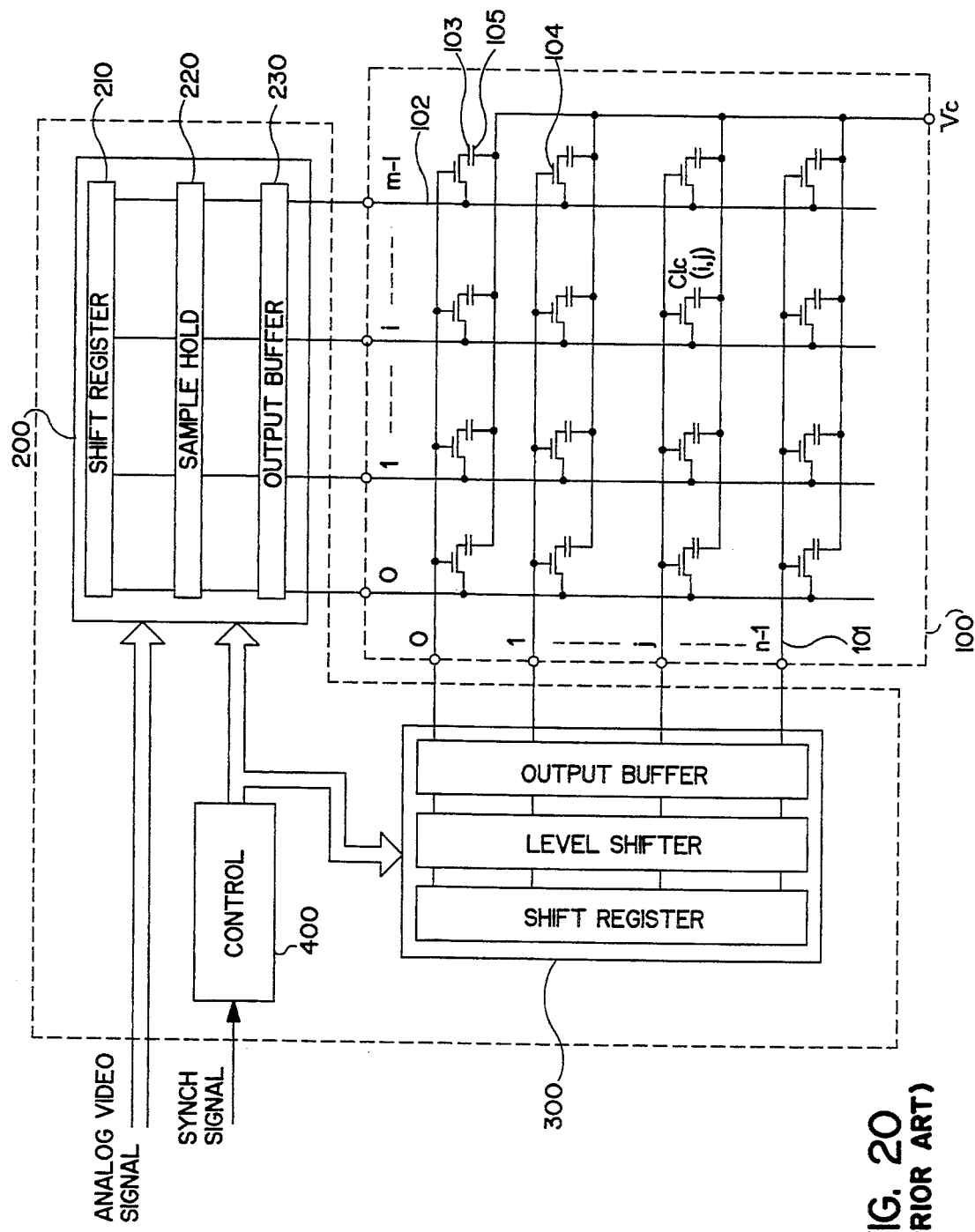
FIG. 20 is a block diagram of a matrix liquid crystal display apparatus using a drive device of the prior art.
Figure 21:
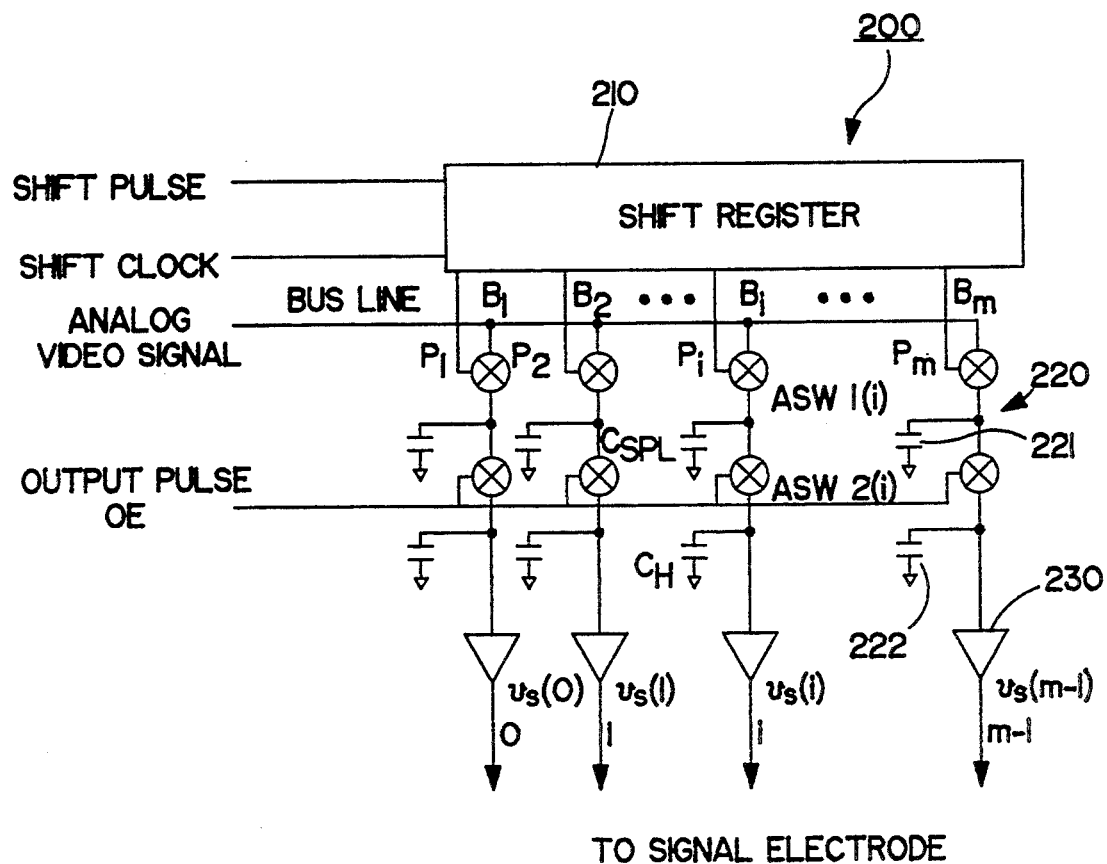
FIG. 21 is a circuit diagram of a source driver of the conventional drive device shown in FIG. 20.
Figure 22:
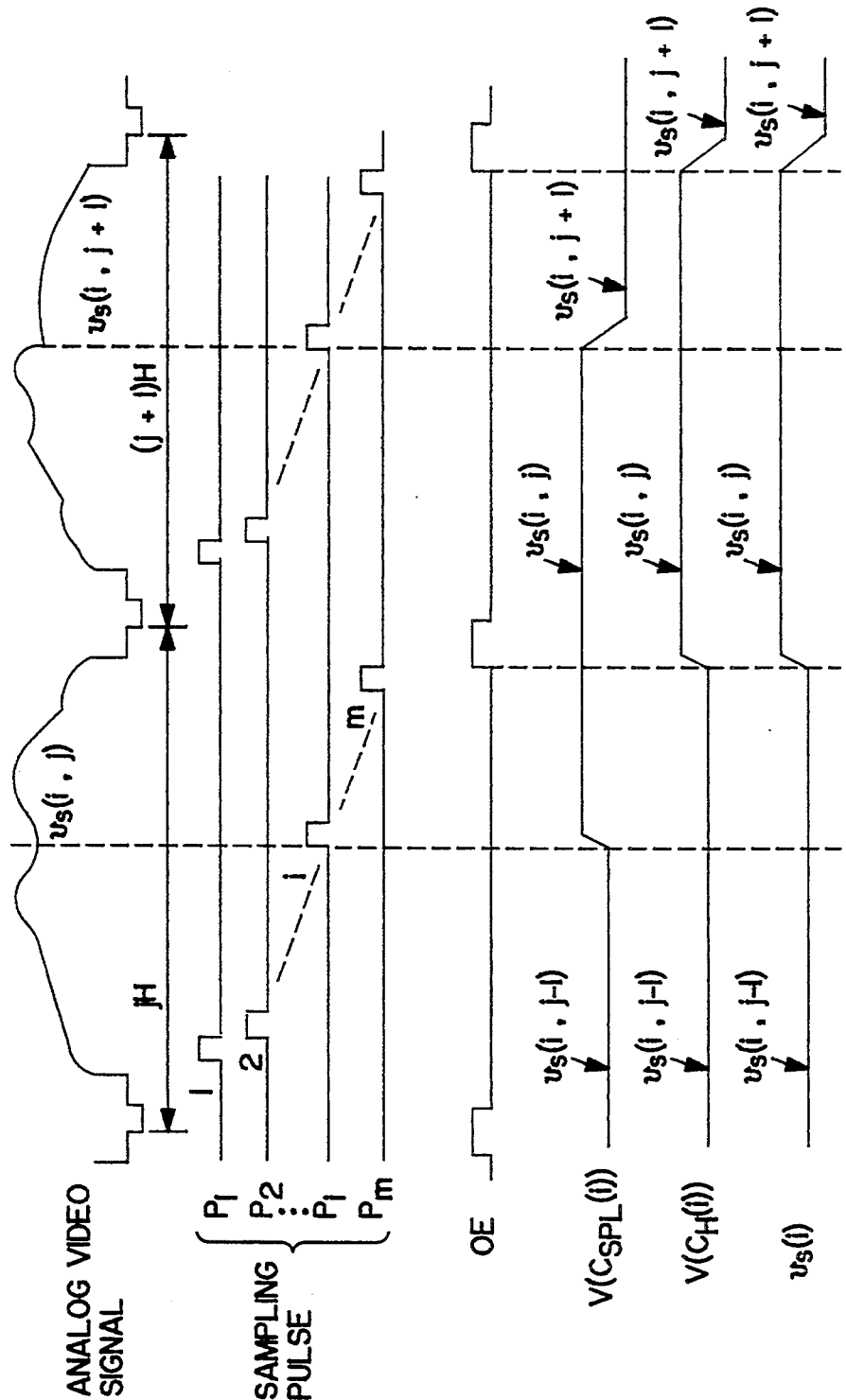
FIG. 22 is a timing chart showing the operation of the source driver of FIG. 21.

FIG. 1 shows a matrix liquid crystal display apparatus in which a drive device according to the invention is used. The display apparatus of FIG. 1 has a TFT liquid crystal panel 100. The TFT liquid crystal panel 100 is driven by a drive device 1 comprising a source driver 2, a gate driver 300, a control circuit 4, and a DC voltage generation circuit 10. The TFT liquid crystal panel 100 and gate driver 300 have essentially the same configuration as those of the prior art shown in FIG. 20, and their detailed description is omitted. The source driver 2 comprises an up-down counter and decoder circuit 20, a digital data memory 30, a data decoder circuit 40, a level shifter circuit 60, and a D/A conversion and output circuit 50. The source driver 2 performs digital-analog conversion of input digital video signals, and sends the resulting amplitude-modulated analog signals to the signal electrodes 102 of the TFT liquid crystal panel 100. The various signals required by the source driver 2 are supplied from the control circuit 4.

Figure 2:
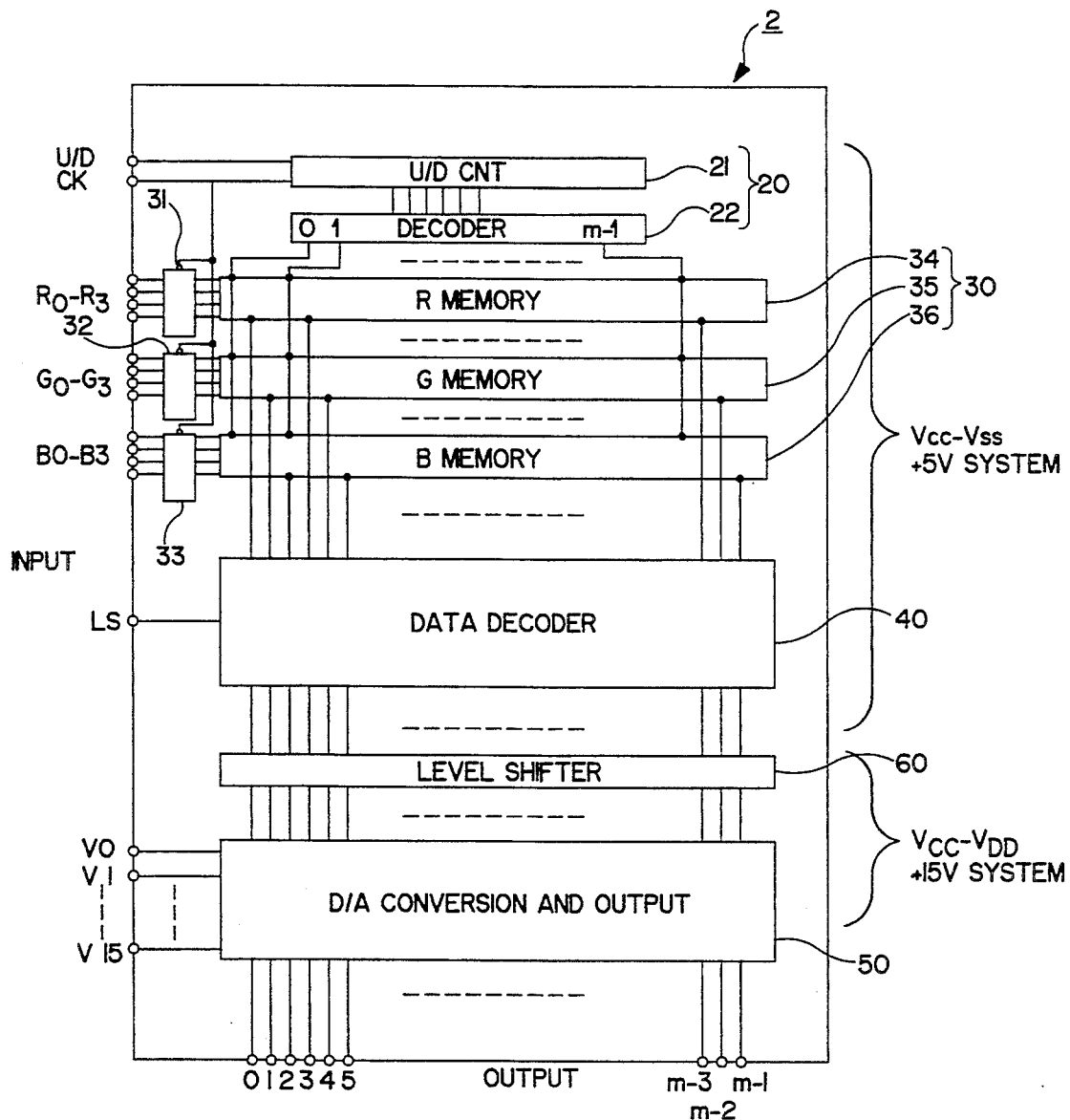
FIG. 2 is a block diagram of a source driver of the device shown in FIG. 1.

The source driver 2 is illustrated in more detail in FIG. 2. In the source driver 2 of FIG. 2 which is designed for performing color display, the RGB video signals are expressed by 4-bit data $R_0$–$R_3$, $G_0$–$G_3$ and $B_0$–$B_3$, respectively. The up-down counter and decoder circuit 20 has an up-down counter 21 and a decoder 22. The up-down counter 21 receives a U/D signal which specifies counting in the direction of increase or in the direction of decrease, and a clock signal CK which actuates the count operation in the up-down counter 21. The output of the up-down counter 21 is decoded by the decoder 22. The up-down counter and decoder circuit 20 may be composed of shift registers.

The R signals ($R_0$–$R_3$), G signals ($G_0$–$G_3$) and B signals ($B_0$–$B_3$) contained in input digital video signals are latched once by latches 31, 32 and 33, respectively, and then according to the output of the decoder 22, they are stored in the corresponding memory regions in an R memory 34, a G memory 35 and a B memory 36 which constitute the digital data memory 30. After digital signals covering one horizontal scanning period have been stored in the digital data memory 30, a latch strobe signal LS is input to supply the data in the digital data memory 30 to the data decoder circuit 40 over parallel lines. The output of the data decoder circuit 40 is supplied to the D/A conversion and output circuit 50 via the level shifter circuit 60. In the D/A conversion and output circuit 50, the DC voltage signals $V_0$–$V_{15}$, each with a different level (16-level gray-scale), are supplied by the DC voltage generation circuit 10. In this embodiment, the levels of the voltage signals increase in sequence from signal $V_{15}$ to signal $V_0$.

Figure 3:
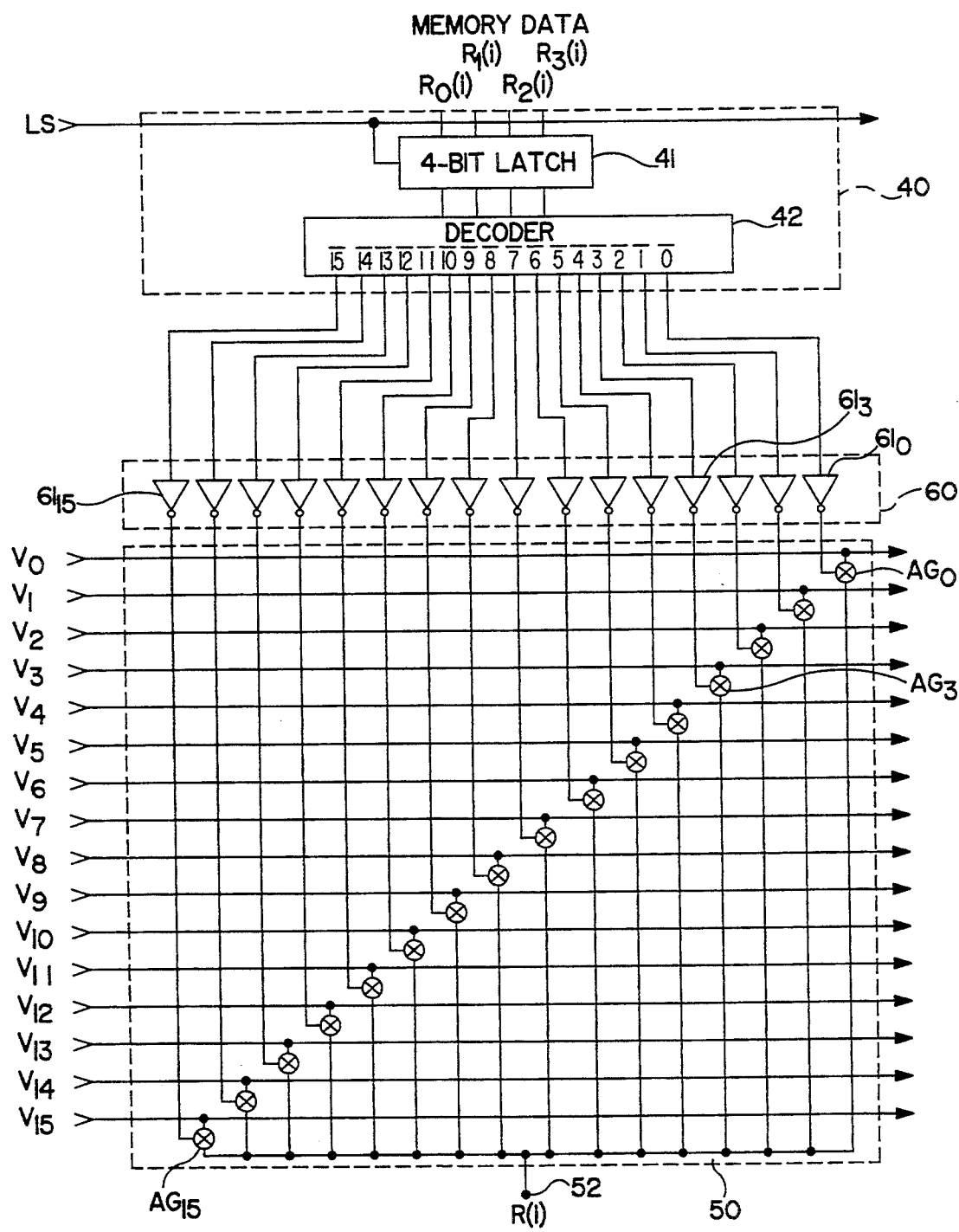
FIG. 3 illustrates a data decoder circuit, a level shifter and a D/A conversion and output circuit of the device shown in FIG. 1.

FIG. 3 shows a block diagram of the system which processes the R signals in the data decoder circuit 40 and D/A conversion and output circuit 50. The data decoder circuit 40 comprises a 4-bit latch circuit 41 which receives the R signals $R_0(i)$–$R_3(i)$ from the R memory 34, and a decoder 42. The R signals $R_0(i)$–$R_3(i)$ are latched in the latch circuit 41 according to the latch strobe signal LS, and decoded by the decoder 42. According to the R signals $R_0(i)$–$R_3(i)$, one of the outputs of the inverted output terminals 0–15 of the decoder 42 becomes low level and the others become high level (e.g., output terminal 3 becomes low level). The levels of the outputs of the decoder 42 are each shifted from the 5 V system to the 15 V system by level shifters $61_0$–$61_{15}$ in the level shifter circuit 60. In the embodiment, the up-down counter and decoder circuit 20, the digital data memory 30 and the data decoder circuit 40 are logic circuits operating on the power source voltages $V_{CC}=5$ V and $V_{SS}=0$ V. In order to drive the TFT liquid crystal panel 100, a voltage which is higher than the logic circuit power source voltage is required, with the result that level conversion as that described above is necessary.

The D/A conversion and output circuit 50 has analog gates $AG_0$–$AG_{15}$ between the supplied DC voltage signals $V_0$–$V_{15}$ and an output terminal 52, respectively. The inverted outputs of the level shifters $61_0$–$61_{15}$ are applied to the control terminals of the analog gates $AG_0$–$AG_{15}$, respectively. When these impressed voltages become high level, the corresponding gates are closed. When the output terminal 3 of the decoder 42 is low level, for example, the output of the level shifter $61_3$ becomes high level, the analog gate $AG_3$ closes, and the DC voltage signal $V_3$ having the fourth level is sent to the signal electrode 102 as the signal R(i). The data decoder circuit 40, level shifter circuit 60 and D/A conversion and output circuit 50 corresponding to each of the signal electrodes 102 operate in parallel in such a manner as described above.

FIG. 4 shows diagrammatically the drive timing of the operation described above. In the example shown in FIG. 4, the DC voltage signals $V_3$, $V_5$ and $V_6$ in the jth horizontal scan, and the DC voltage signals $V_{10}$, $V_{12}$ and $V_{14}$ in the (j+1)th horizontal scan are selected as the R signal, G signal and B signal, respectively. In the embodiment, the time required for D/A conversion of a video signal is essentially the time required for decoding by the decoder 42. Therefore, the time required for D/A conversion is extremely short. Further, if the digital data memory 30 stores video signals for one scan as in the case of the embodiment, the entire of the horizontal scanning period following the horizontal scanning period in which the video signals have been input can be used for D/A conversion. Therefore, the process of storing the input video signals into the digital data memory 30 must be done quickly, but D/A conversion can be done at a slower rate.

Further, since the TFT liquid crystal panel 100 and other display panels deteriorate more quickly when a DC component is contained in the impressed voltage, the polarities of the voltage signals $V_0$–$V_{15}$ impressed on the display panel can be changed alternately as each predetermined horizontal scanning period elapses, in order to prevent deterioration of the display panel.

EXAMPLE 2

Figure 5:
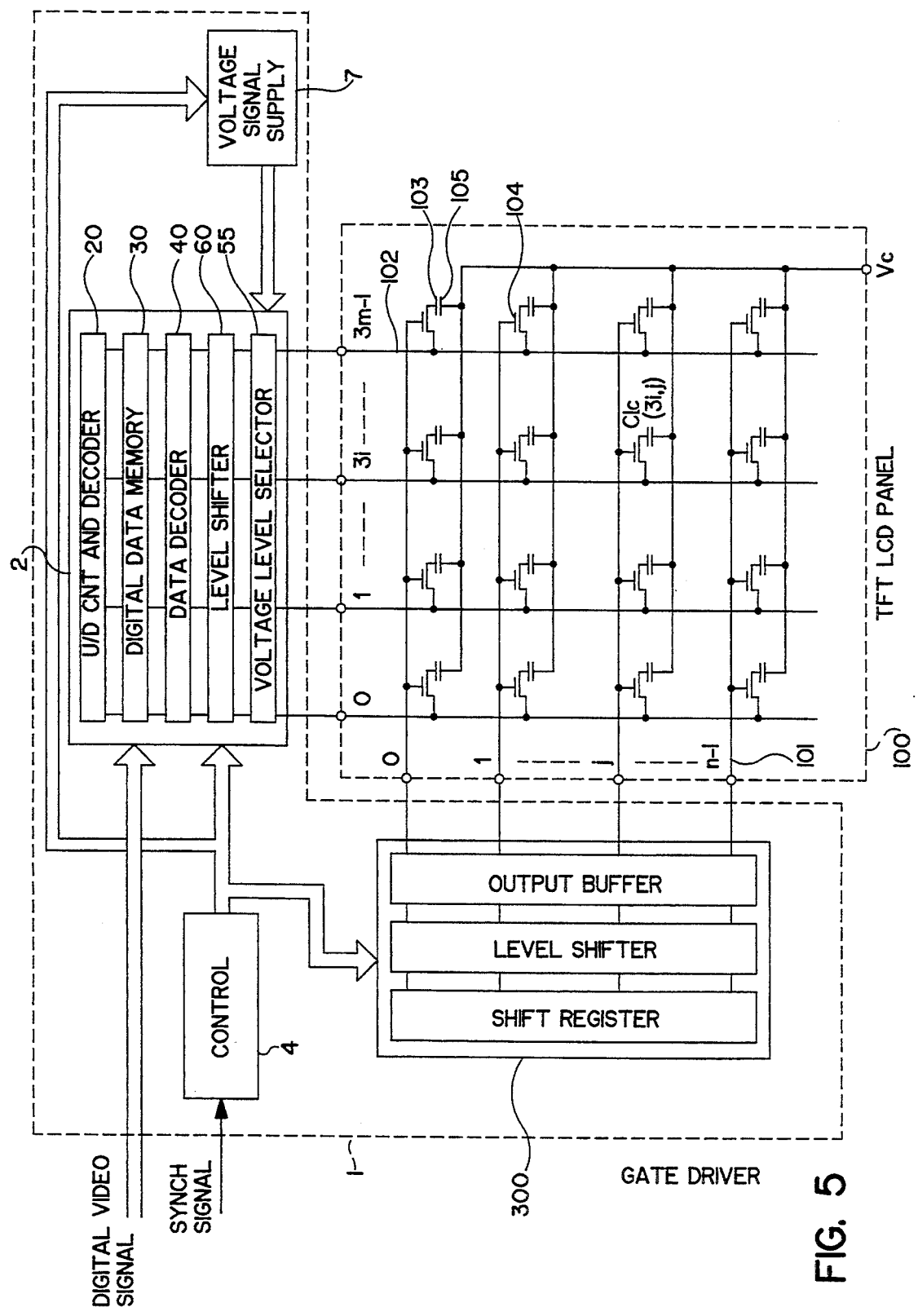
FIG. 5 is a block diagram of a matrix liquid crystal display apparatus using another drive device of the invention.

FIG. 5 shows a matrix liquid crystal display apparatus using another driving circuit according to the invention. The drive device 1 shown in FIG. 5 comprises a source driver 2, a gate driver 300, a voltage signal supply circuit 7, and a control circuit 4. The gate driver 300 has essentially the same configuration as that of the prior art shown in FIG. 20. The voltage signal supply circuit 7 supplies a plurality of voltage signals with mutually different levels to the source driver 2. The voltage levels of the voltage signals with respect to the voltage $v_c$ impressed on the counter electrodes 105 have alternating positive and negative periods. The timing signal required for operating the voltage signal supply circuit 7 is supplied from the control circuit 4. In accordance with the value of the input digital video signal, the source driver 2 selects one of the multiple level voltage signals supplied from the voltage signal supply circuit 7 to generate an amplitude-modulated voltage signal which is then sent to the signal electrodes 102 of the TFT liquid crystal panel 100. The source driver 2 comprises an up-down counter and decoder circuit 20, a digital data memory 30, a data decoder circuit 40, a level shifter circuit 60, and a voltage level selector circuit 55. The various signals required for operating the source driver 2 are supplied from the control circuit 4.

Figure 6:
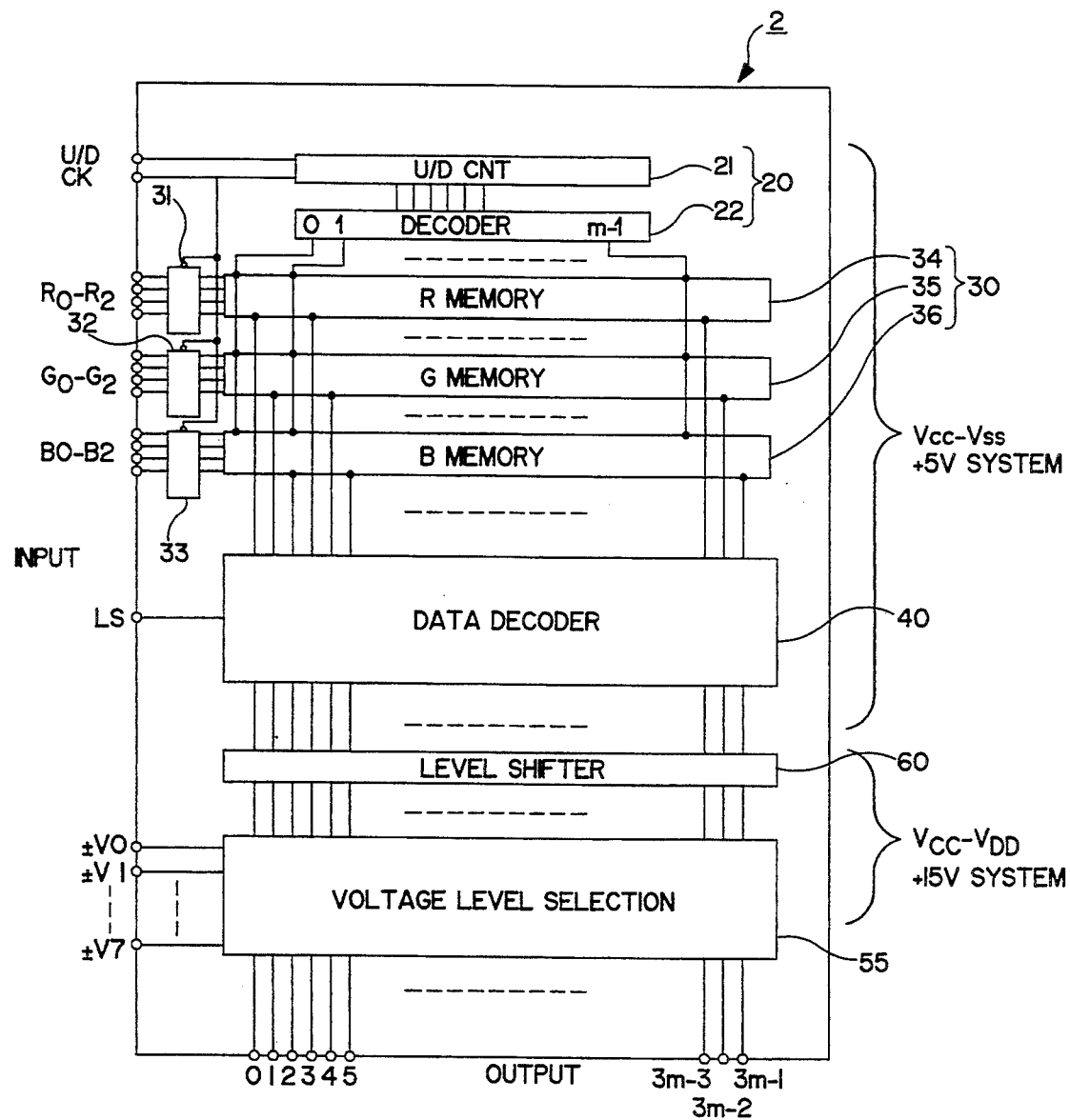
FIG. 6 is a block diagram of the source driver of the device shown in FIG. 5.

The configuration of the source driver 2 is illustrated in FIG. 6. The source driver 2 of FIG. 6 is designed for color display, but unlike the source driver used in the first embodiment, the RGB signals forming a video signal are each expressed by the 3-bit data $R_0$–$R_2$, $G_0$–$G_2$ and $B_0$–$B_2$. The voltage level selector circuit 55 corresponds to the D/A conversion and output circuit 50 in the first embodiment, and receives the voltage signals $\pm V_0$–$\pm V_7$ from the voltage signal supply circuit 7. Except for these differences, the source driver 2 in this embodiment has nearly the same configuration as the source driver in the first embodiment.

Figure 7:
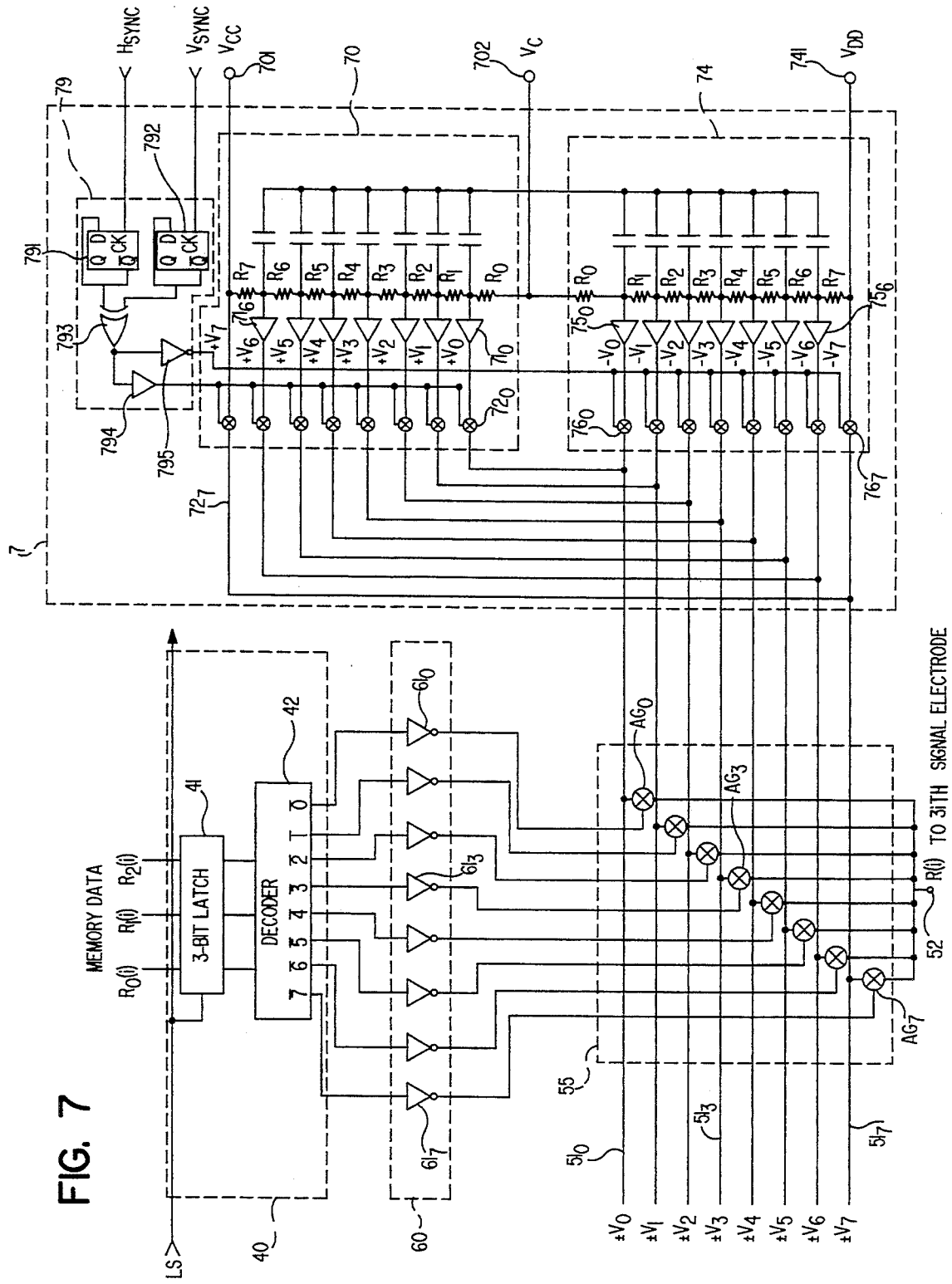
FIG. 7 illustrates a data decoder circuit, a level shifter and a D/A conversion and output circuit of the device shown in FIG. 5.

FIG. 7 shows a system for processing the R signals in the data decoder circuit 40 and the voltage level selector circuit 55. FIG. 7 shows also the voltage signal supply circuit 7. The data decoder circuit 40 has a 3-bit latch circuit 41 which receives the R signals $R_0(i)$–$R_2(i)$ from the R memory 34, and a decoder 42. The R signals $R_0(i)$–$R_2(i)$ are latched in the latch circuit 41 when the latch strobe signal LS is input, and are then decoded in the decoder 42. In accordance with the contents of the R signals $R_0(i)$–$R_2(i)$, one of the outputs of the inverted output terminals 0–7 of the decoder 42 becomes low level, and the others become high level. The outputs of the decoder 42 are each shifted from the 5 V system to the 15 V system by the level shifters $61_0$–$61_7$ in the level shifter circuit 60.

In the voltage level selector circuit 55, analog gates $AG_0$–$AG_7$ are disposed between lines $51_0$–$51_7$ for supplying the voltage signals $\pm V_0$–$\pm V_7$ from the voltage signal supply circuit 7 and an output terminal 52. The inverted outputs of the level shifters $61_0$–$61_7$ are supplied to the control terminals of the analog gates $AG_0$–$AG_7$, respectively. When these impressed voltages become high level, the corresponding gates become closed. When the output terminal 3 of the decoder 42 is low level, for example, the output of the level shifter $61_3$ becomes high level, the analog gate $AG_3$ closes, and the voltage signal $\pm V_3$ on the line $51_3$ is sent as an R(i) signal to the 3ith signal electrode 102. The portions of the data decoder circuit 40, level shifter circuit 60 and voltage level selector circuit 55 which correspond to each of the signal electrodes 102 operate in parallel and in such a manner as described above.

The voltage signal supply circuit 7 comprises a positive voltage signal output circuit 70, a negative voltage signal output circuit 74, and a selector circuit 79. The positive voltage signal output circuit 70 has eight resistors $R_0$–$R_7$ connected in series between a terminal 701 to which is applied the power source voltage $V_{CC}$ higher than the voltage $v_c$ of the counter electrode 105 and a terminal 702 to which is applied the voltage $v_c$. Voltage signals $+V_0$–$+V_6$ are obtained from the nodes of the series connection of the resistors $R_0$–$R_7$ via buffers $71_0$–$71_6$. The power source voltage $V_{CC}$ is output as the voltage signal $+V_7$. The voltage signals $+V_0$–$+V_7$ are supplied to the lines $51_0$–$51_7$ of the voltage level selector circuit 55 via respective analog gates $72_0$–$72_7$. The negative voltage signal output circuit 74 has eight resistors $R_0$–$R_7$ connected in series between a terminal 741 to which is impressed the power source voltage $V_{DD}$ which is lower than the voltage $v_c$ and the terminal 702. Voltage signals $-V_0$–$-V_6$ are obtained from the nodes of the series connection of the resistors $R_0$–$R_7$ via buffers $75_0$–$75_6$. The power source voltage $V_{DD}$ is output as the voltage signal $-V_7$. The voltage signals $-V_0$–$-V_7$ are supplied to the lines $51_0$–$51_7$ via respective analog gates $76_0$–$76_7$.

The selector circuit 79 comprises two D flip-flops 791 and 792 which function as T flip-flops. The horizontal synchronizing signal $H_{SYNC}$ is input to the clock terminal of the D flip-flop 791. The vertical synchronizing signal $V_{SYNC}$ is input to the clock terminal of the D flip-flop 792. In this configuration, therefore, the output of the D flip-flop 791 inverts every time the horizontal synchronizing signal $H_{SYNC}$ is input, and the output of the D flip-flop 792 inverts every time the vertical synchronizing signal $V_{SYNC}$ is input. The outputs of the D flip-flops 791 and 792 are input to an XOR gate 793, and the output of the XOR gate 793 is input to the non-inverting level shifter 794 and the inverting level shifter 795. The output of the non-inverting level shifter 794 controls the analog gates $72_0$–$72_7$. The output of inverting level shifter 795 controls the analog gates $76_0$–$76_7$.

When the outputs of the D flip-flops 791 and 792 do not match, the outputs of the level shifters 794 and 795 become high level and low level, respectively, and the analog gates $72_0$–$72_7$ become closed, resulting in that the voltage signals $+V_0$–$+V_7$ are supplied to the voltage level selector circuit 55. When the outputs of the D flip-flops 791 and 792 match, the outputs of the level shifters 794 and 795 become low level and high level, respectively, the analog gates $76_0$–$76_7$ become closed, and the voltage signals $-V_0$–$-V_7$ are supplied to the voltage level selector circuit 55. Further, the output of the D flip-flop 792 remains constant during one frame and the output of the D flip-flop 791 inverts for each horizontal scanning period. In one frame, the voltage signals $+V_0$–$+V_7$ are supplied to the voltage level selector circuit 55 in odd-numbered horizontal scanning periods in one frame, and the voltage signals $-V_0$–$-V_7$ are supplied to the voltage level selector circuit 55 in even-numbered horizontal scanning periods. As mentioned above, the output of the D flip-flop 791 inverts for each horizontal scanning period. In the frame following the above-mentioned frame, therefore, the voltage signals $+V_0$–$+V_7$ are supplied to the voltage level selector circuit 55 in the even-numbered horizontal scanning periods, and the voltage $-V_0$–$-V_7$ are supplied to the voltage level selector circuit 55 in the odd-numbered horizontal scanning periods. By means of the function of the voltage signal supply circuit 7 described above, the voltage impressed on the liquid crystal layer $+V_i$ ($i=0, ..., 7$)$-v_c>0$ when the voltage signals $+V_0$–$+V_7$ are supplied to the voltage level selector circuit 55, and $-V_i-v_c<0$ when the voltage signals $-V_0$–$-V_7$ are supplied to the voltage level selector circuit 55. Since these two cases occur alternately, an AC voltage is impressed on the pixels so that deterioration of the liquid crystal layer is prevented.

Figure 8:
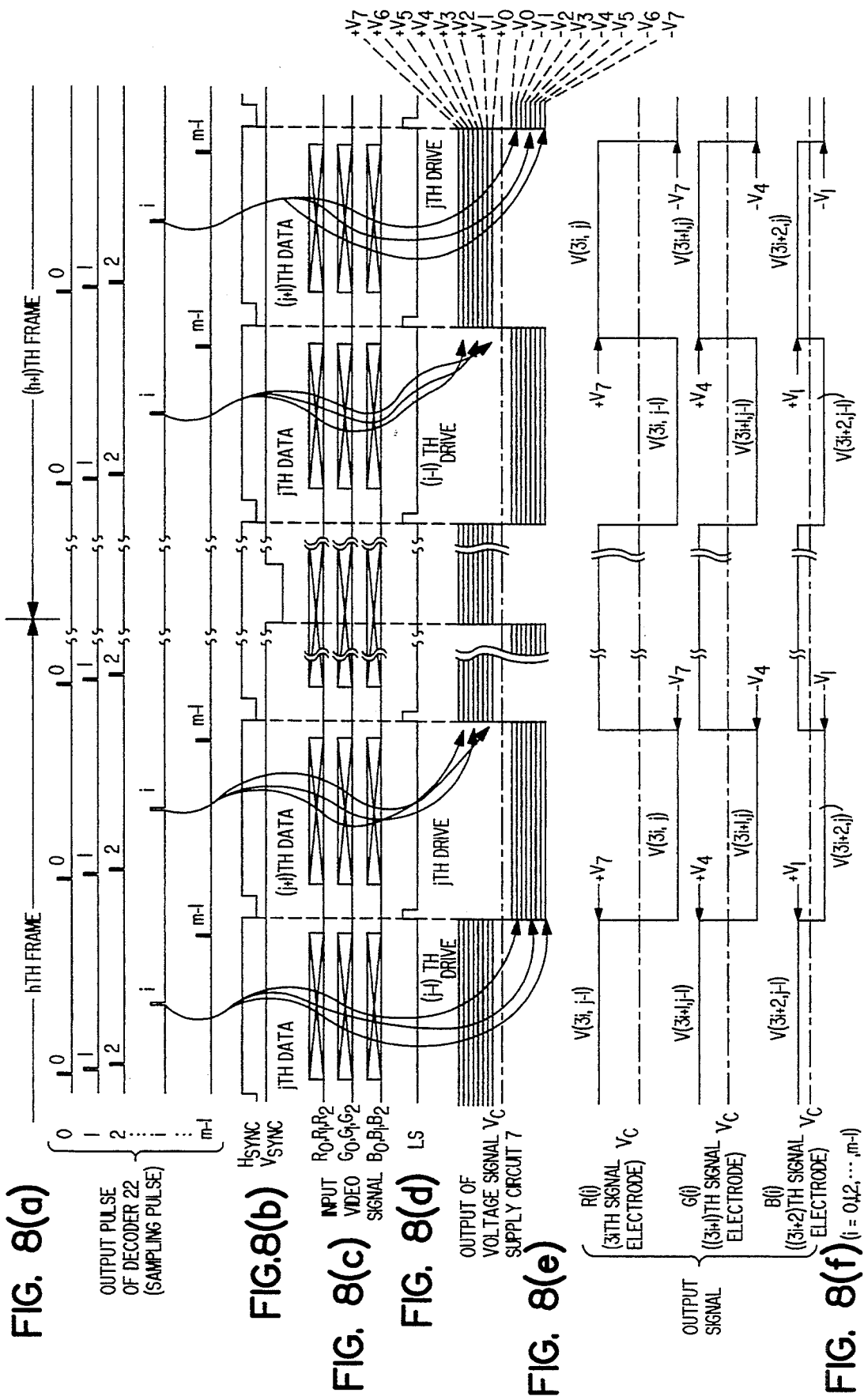
FIG. 8 is a timing chart showing the operation of the device shown in FIG. 5.

FIG. 8 shows diagrammatically one example of display drive timing in the second embodiment. In the example shown in FIG. 8, the voltage signals $-V_0$–$-V_7$ are used to drive the jth horizontal scanning line in the hth frame, and the voltage $+V_0$–$+V_7$ are used to drive the (j+1)th horizontal scanning line. In contrast to this, the voltage signals $+V_0$–$+V_7$ are used to drive the jth horizontal scanning line in the (h+1)th frame, and the voltage signals $-V_0$–$-V_7$ are used to drive the (j+1)th horizontal scanning line, in other words, the voltage signals which have been used in the hth frame are reversed in the (h+1)th frame. When considering the jth horizontal scanning line, for example, the drive of the horizontal scanning line is performed so that one alternating cycle is completed in two frames. That is, where the frame frequency is f, then the frequency of the above-mentioned alternating cycles is f/2.

In the second embodiment, the time required for converting the digital video signals to voltage signals essentially depends on the time required for decoding by the decoder 42. Therefore, the majority of each horizontal scanning period can be used to drive the pixels.

EXAMPLE 3

Figure 12:
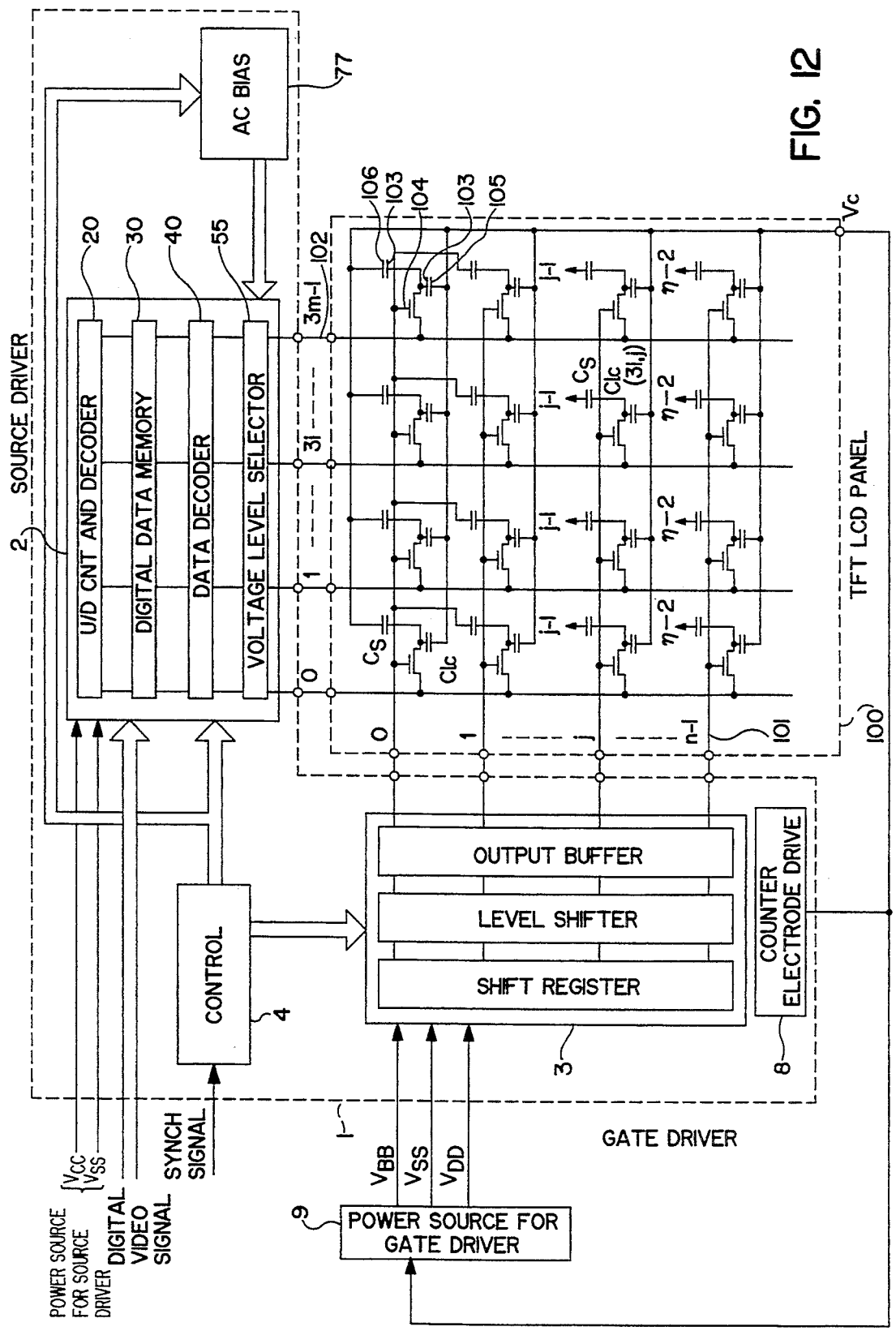
FIG. 12 is a block diagram of a matrix liquid crystal display apparatus using a further drive device of the invention.
Figure 23:
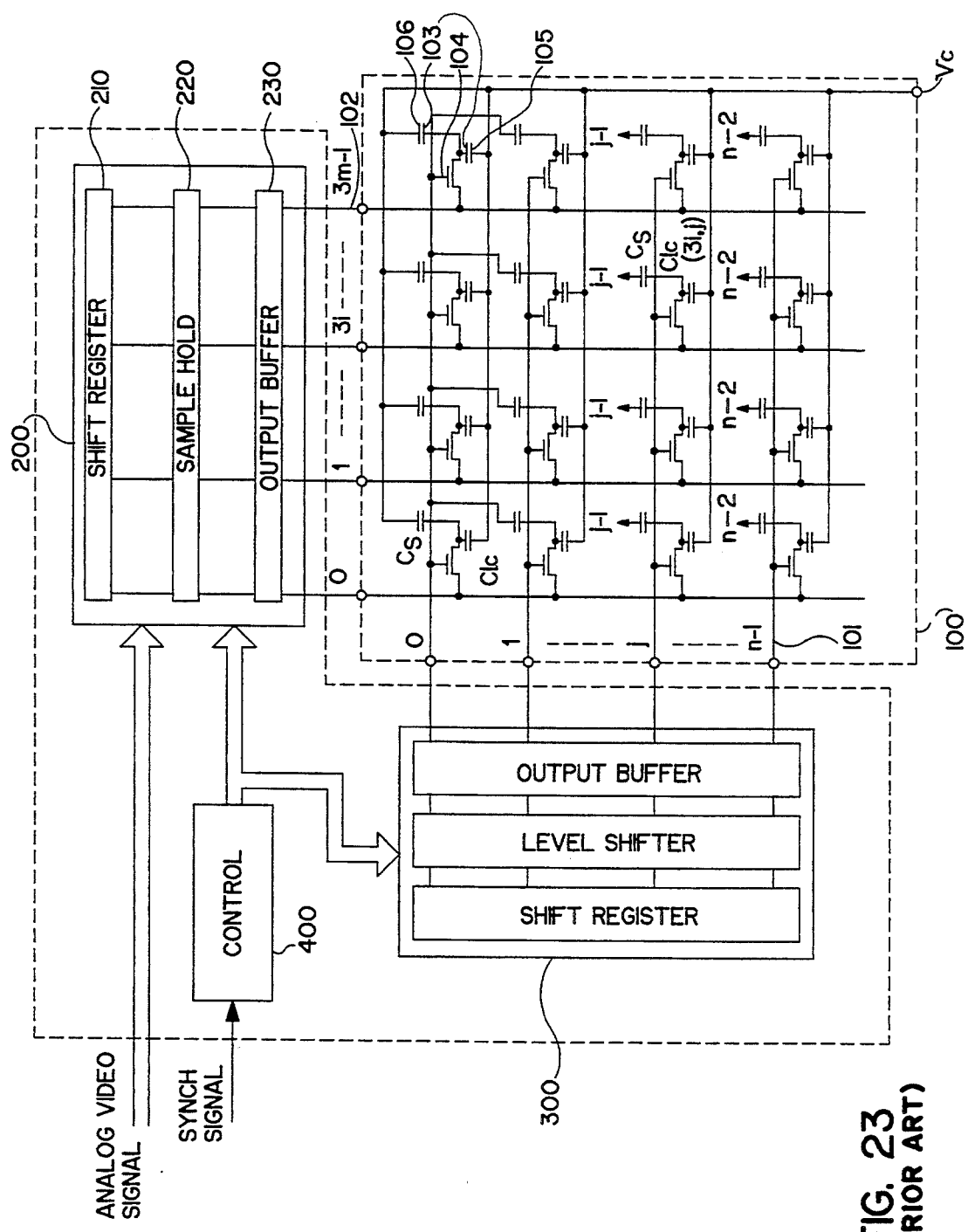
FIG. 23 is a block diagram of another matrix liquid crystal display apparatus of the prior art.

FIG. 12 shows a matrix liquid crystal display apparatus using another driving circuit according to the invention. In the display apparatus of FIG. 12, a TFT liquid crystal panel 100 is of a so-called CS on-gate type, and is driven by a driving apparatus 1 comprising a source driver 2, a gate driver 3, an AC bias circuit 77, a counter electrode drive circuit 8, and a control circuit 4. The gate driver 3 has a similar configuration as the gate driver 300 of the conventional drive device shown in FIG. 23, but as described below, differs from the gate driver 300 in that it performs a floating operation. The AC bias circuit 77 supplies a plurality of voltage signals with mutually different levels to the source driver 2. The levels of the voltage signals with respect to a suitable reference voltage have alternating positive and negative periods. The timing signals required for operating the AC bias circuit 77 are supplied from the control circuit 4. The source driver 2 selects one of the multiple level voltage signals supplied from the AC bias circuit 77, in accordance with the value of the input digital video signal. The selected voltage signal is sent to the signal electrodes 102 of the TFT liquid crystal panel 100. The source driver 2 comprises an up-down counter and decoder circuit 20, a digital data memory 30, a data decoder circuit 40, and a voltage level selector circuit 55. The various signals required for operating the source driver 2 are supplied from the control circuit 4. The output of the counter electrode drive circuit 8 is supplied to the counter electrodes 105 and the gate driver power source circuit 9. The counter electrodes 105 are AC-driven by the output of the counter electrode drive circuit 8.

Figure 13A:
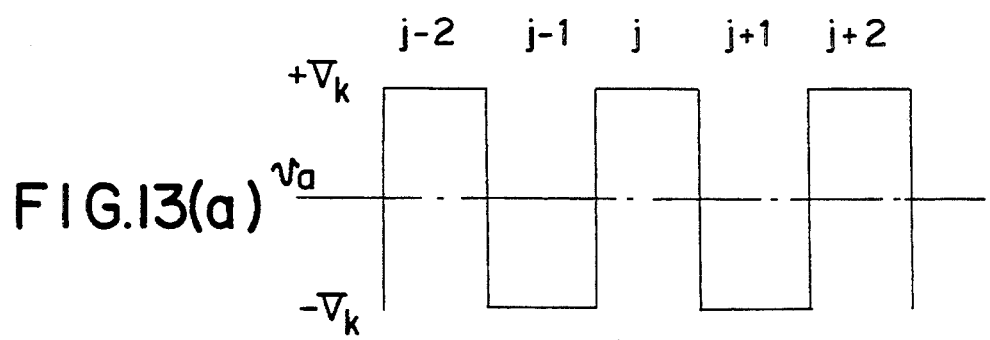
FIG. 13 shows waveforms of drive voltage for explaining the operating principle of the device shown in FIG. 12.
Figure 13B:
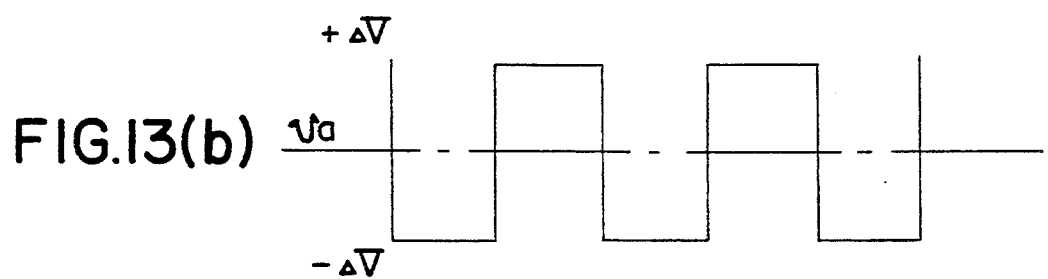
Figure 13C:
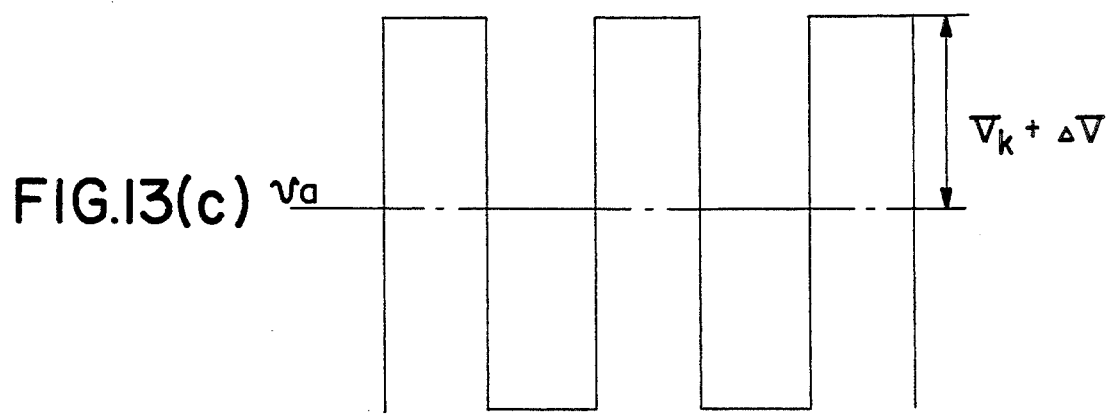

The operating principle of this embodiment will be described. The purpose of providing the present drive device with the counter electrode drive circuit 8 for AC-driving the counter electrodes 105 is to reduce the level of the drive voltage for the signal electrodes 102. The signal electrodes 102 are AC-driven so that the polarity of the voltage applied to the signal electrodes 102 inverts each time of selection of the scanning electrodes 101, as shown in (a) of FIG. 13 in which j−2, j−1, ... denote the numbers of the selected scanning electrodes 101. If an AC voltage ( the intermediate voltage or reference voltage is the voltage $v_a$) the phase of which is shifted by 180 degrees from that of the AC-drive of the signal electrodes is impressed on the counter electrodes 105 ((b) of FIG. 13 ), the substantial amplitude of the impressed voltage as seen from the counter electrodes 105 is the sum of the amplitude of the voltage impressed on the signal electrodes and the amplitude of the voltage impressed on the counter electrodes ((c) of FIG. 13). For this reason, the signal electrode drive voltage necessary to obtain the same impressed voltage as in the prior art can be lower than that required when AC-drive of the counter electrodes 105 is not performed. Therefore, the operating voltage of intermediate-voltage parts conventionally contained in source drivers can be lowered, and in addition the entire source driver 2 can be driven with a single power supply which supplies voltages suitable for the logic levels (e.g., +5 V) in the logic circuits.

Figure 24:
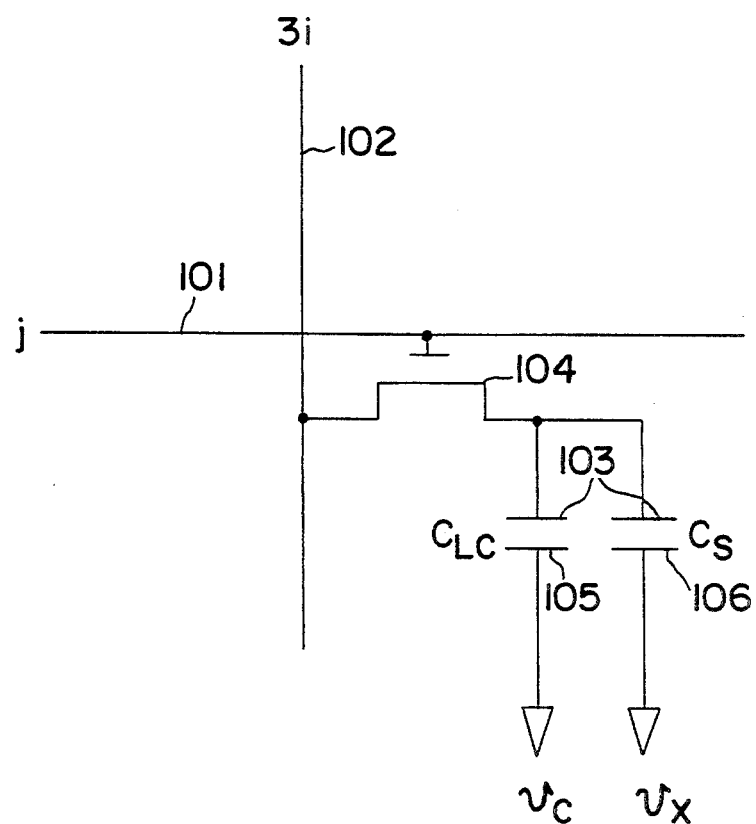
FIG. 24 is an equivalent circuit diagram of the pixels in the TFT liquid crystal display panel shown in FIG. 23.
Figure 25:
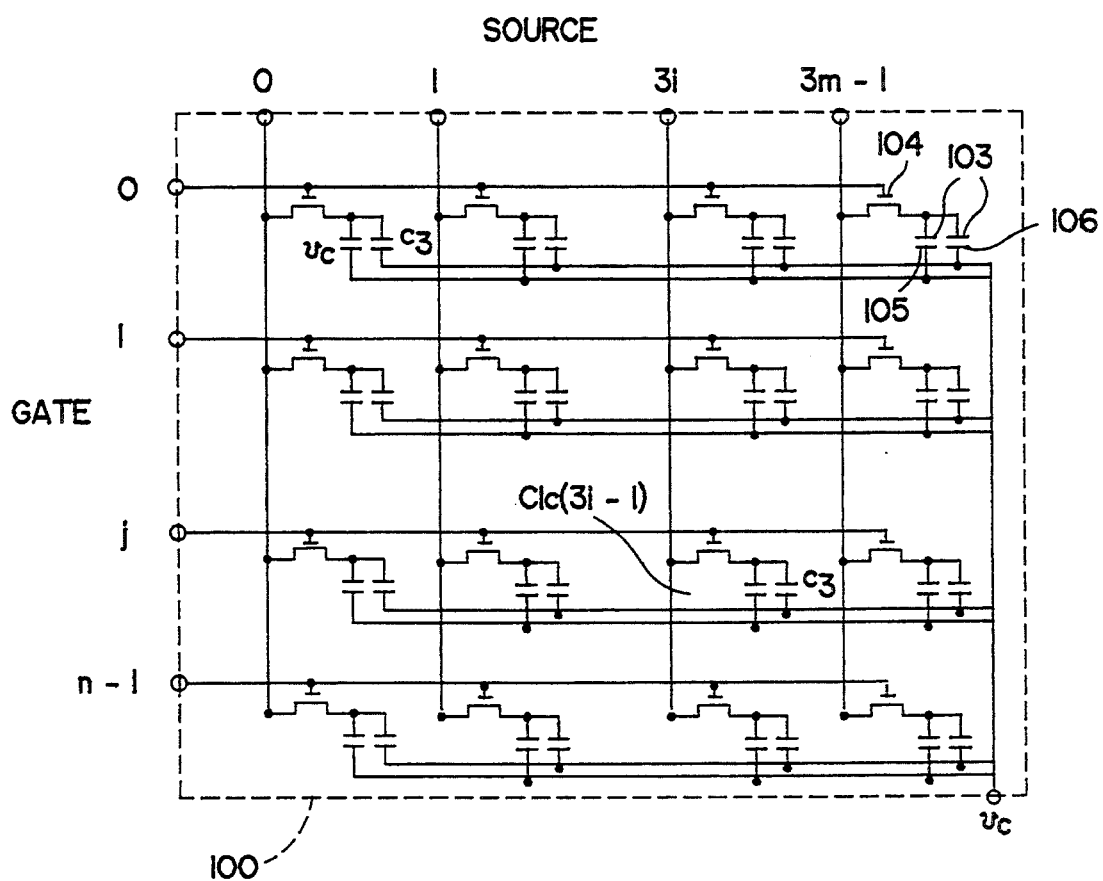
FIG. 25 is an equivalent circuit diagram showing a typical TFT liquid crystal panel in which supplemental capacitances are connected electrically to counter electrodes.

For example, in a matrix liquid crystal display apparatus with pixels represented by the equivalent circuit shown in FIG. 24, when the potential $v_c$ at the counter electrodes 105 is constant as in the prior art, the voltage $V_{LC}$ latched by the capacitance $C_{LC}$ of a liquid crystal element is constant during the latching period when the pixel electrodes 103 are not driven. However, when the counter electrodes 105 are AC-driven, as shown in (b) of FIG. 13, the voltage $V_{LC}$ changes accompanying changes in the potential at the counter electrodes 105, and is expressed as follows.

$$V_{LC} = V_B \pm \frac{\Delta V}{1 + C_S/C_{LC}}$$

where, the voltage $V_B$ is constant, and $C_S$ is a supplemental capacitance. Also, $\pm \Delta V/(1+C_S/C_{LC})$ is the voltage fluctuation resulting from AC-drive of the counter electrodes 105. In order to cancel out these kinds of fluctuations in the voltage $V_{LC}$, the drive device of the embodiment has a means for AC-driving the supplemental capacitance electrodes 106 with the same phase as the AC-drive for the counter electrodes 105. Especially, by impressing an AC voltage with substantially the same amplitude as the AC voltage impressed on the counter electrodes 105, on the supplemental capacitance electrodes 106, fluctuations in the voltage $V_{LC}$ almost completely disappear.

Figure 14:
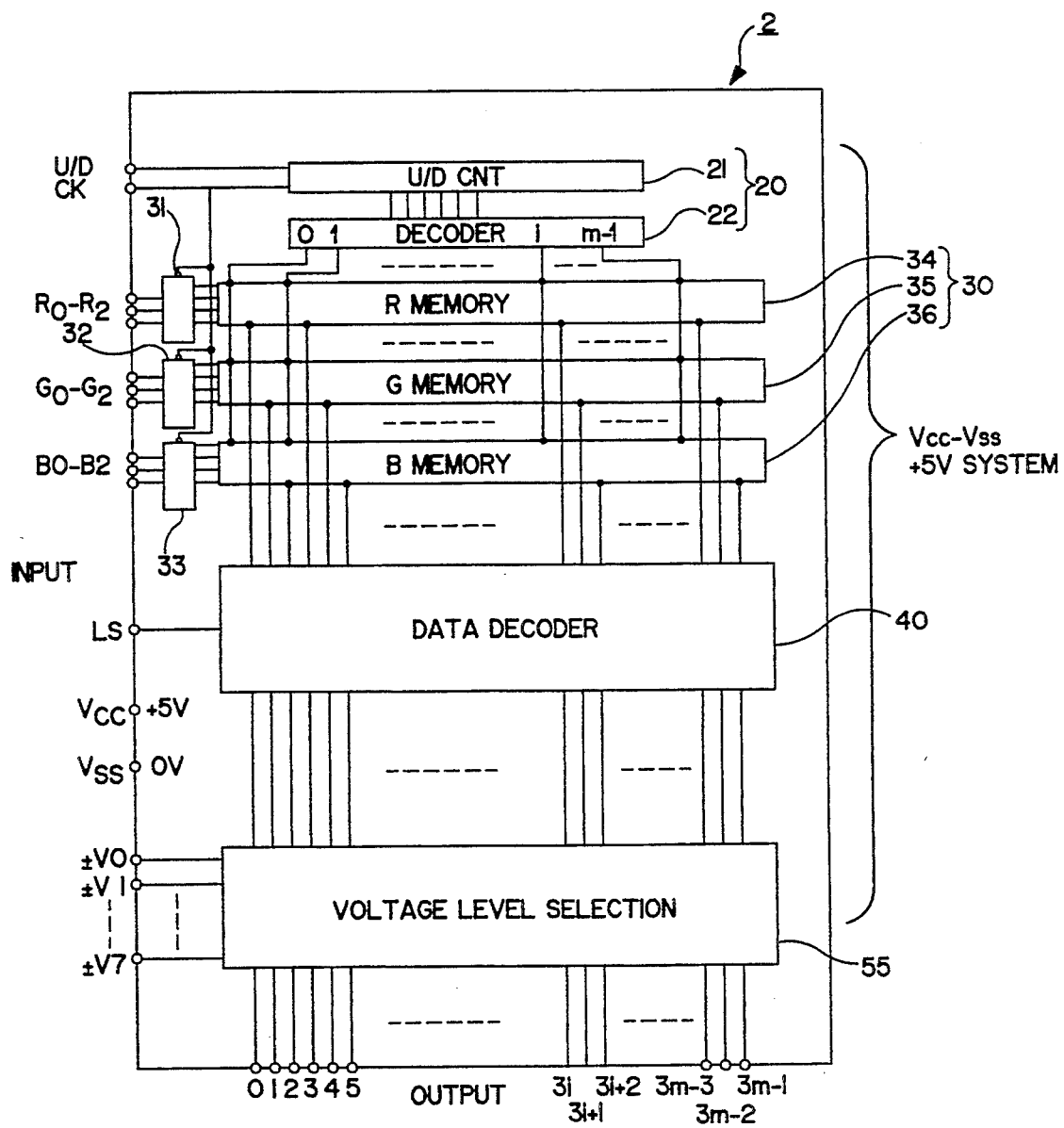
FIG. 14 is a block diagram of a source driver of the device shown in FIG. 12.

The source driver 2 is shown in FIG. 14. As in the second working example illustrated in FIG. 5, in the third embodiment, a video signal composed of RGB signals expressed by the 3-bit data $R_0$–$R_2$, $G_0$–$G_2$ and $B_0$–$B_2$ is input to the source driver 2. Unlike the source driver of the second embodiment, however, the entire source driver 2 operates on a single 5-volt power source, thereby eliminating a level shifter circuit. Except that the entire source driver 2 operates on a single power source ($V_{CC}$=+5 V, $V_{SS}$=0 V), that it has no level shifter circuit, and that the AC bias circuit 77 is used instead of the voltage signal supply circuit 7, its configuration is the same as that in the second embodiment.

Figure 15:
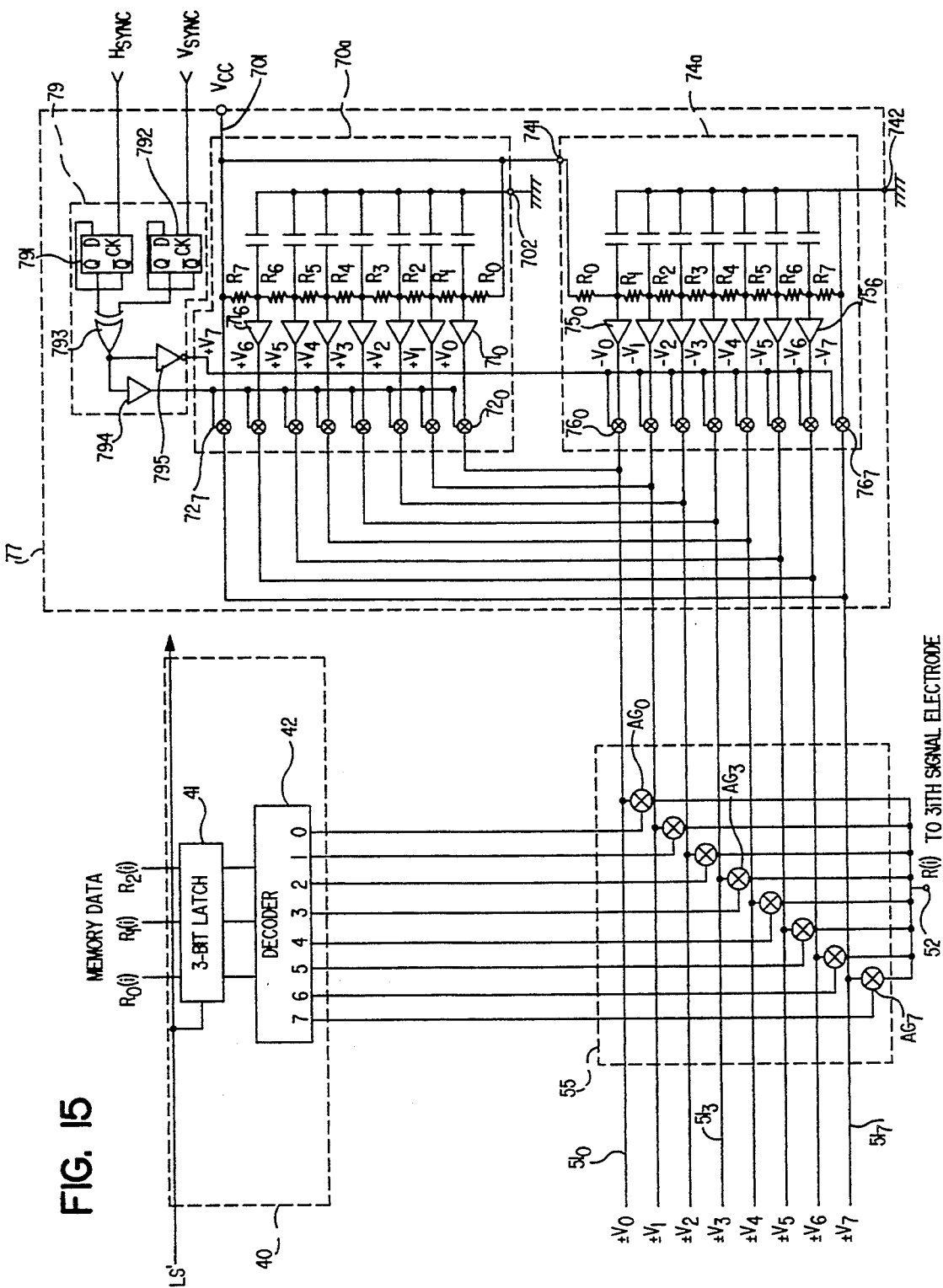
FIG. 15 shows a data decoder circuit, a voltage level selector circuit and an AC bias circuit of the device shown in FIG. 12.

FIG. 15 shows a system for processing the R signal in the data decoder circuit 40 and the voltage level selector circuit 55. FIG. 15 shows also the AC bias circuit 77.

The data decoder circuit 40 has a 3-bit latch circuit 41 which receives the R signals $R_0(i)$–$R_2(i)$ from the R memory 34, and a data decoder 42. The R signals $R_0(i)$–$R_2(i)$ are latched in the latch circuit 41 when the latch strobe signal LS is input, and are then decoded in the decoder 42. Depending on the contents of the R signals $R_0(i)$–$R_2(i)$, one of the outputs of the output terminals 0–7 of the data decoder 42 becomes high level, and the others become low level. The outputs of the data decoder 42 are supplied to the voltage level selector circuit 55.

In the voltage level selector circuit 55, analog gates $AG_0$–$AG_7$ are disposed between lines $51_0$–$51_7$ for supplying the voltage signals $\pm V_0$–$\pm V_7$ from the AC bias circuit 77 and an output terminal 52. The outputs of the data decoder 42 are supplied to the gate input terminals of the analog gates $AG_0$–$AG_7$, respectively. When these outputs become high level, the corresponding gates become closed. When the output of terminal 7, for example, of the decoder 42 is of a high level, the analog gate $AG_7$ closes, and the voltage signal $\pm V_7$ on the line $51_7$ is sent to the 3ith signal electrode 102 as an R(i) signal. The data decoder circuit 40 and voltage level selector circuits 55 which correspond to each of the signal electrodes 102 operate in parallel and in a manner as described above.

The AC bias circuit 77 comprises a first voltage signal output circuit 70a, a second voltage signal output circuit 74a, and a selector circuit 79. The first voltage signal output circuit 70a has eight resistors $R_0$–$R_7$ connected in series between a terminal 701 on which is impressed the power source voltage $V_{CC}$, and a terminal 702 on which is impressed the ground voltage. Voltage signals $\pm V_0$–+$V_6$ are obtained from the nodes of the series connection of the resistors $R_0$–$R_7$ via buffers $71_0$–$71_6$. The power source voltage $V_{CC}$ is output as the voltage signal +$V_7$. The voltage signals +$V_0$–+$V_7$ are supplied to the lines $51_0$–$51_7$ of the voltage level selector circuit 55 via respective analog gates $72_0$–$72_7$. The second voltage signal output circuit 74a has eight resistors $R_0$–$R_7$ connected in series between a terminal 741 on which is impressed the power source voltage $V_{CC}$ and a terminal 742 on which is impressed the ground voltage $V_{SS}$. Voltage signals −$V_0$––$V_6$ are obtained from the nodes of the series connection of the resistors $R_0$–$R_7$ via buffers $75_0$–$75_6$. The ground voltage $V_{SS}$ is output as the voltage signal −$V_7$. The voltage signals −$V_0$––$V_7$ are supplied to the lines $51_0$–$51_7$ via respective analog gates $76_0$–$76_7$.

The selector circuit 79 has the same configuration as the selector circuit in the second embodiment, so its explanation is omitted.

Figure 16:
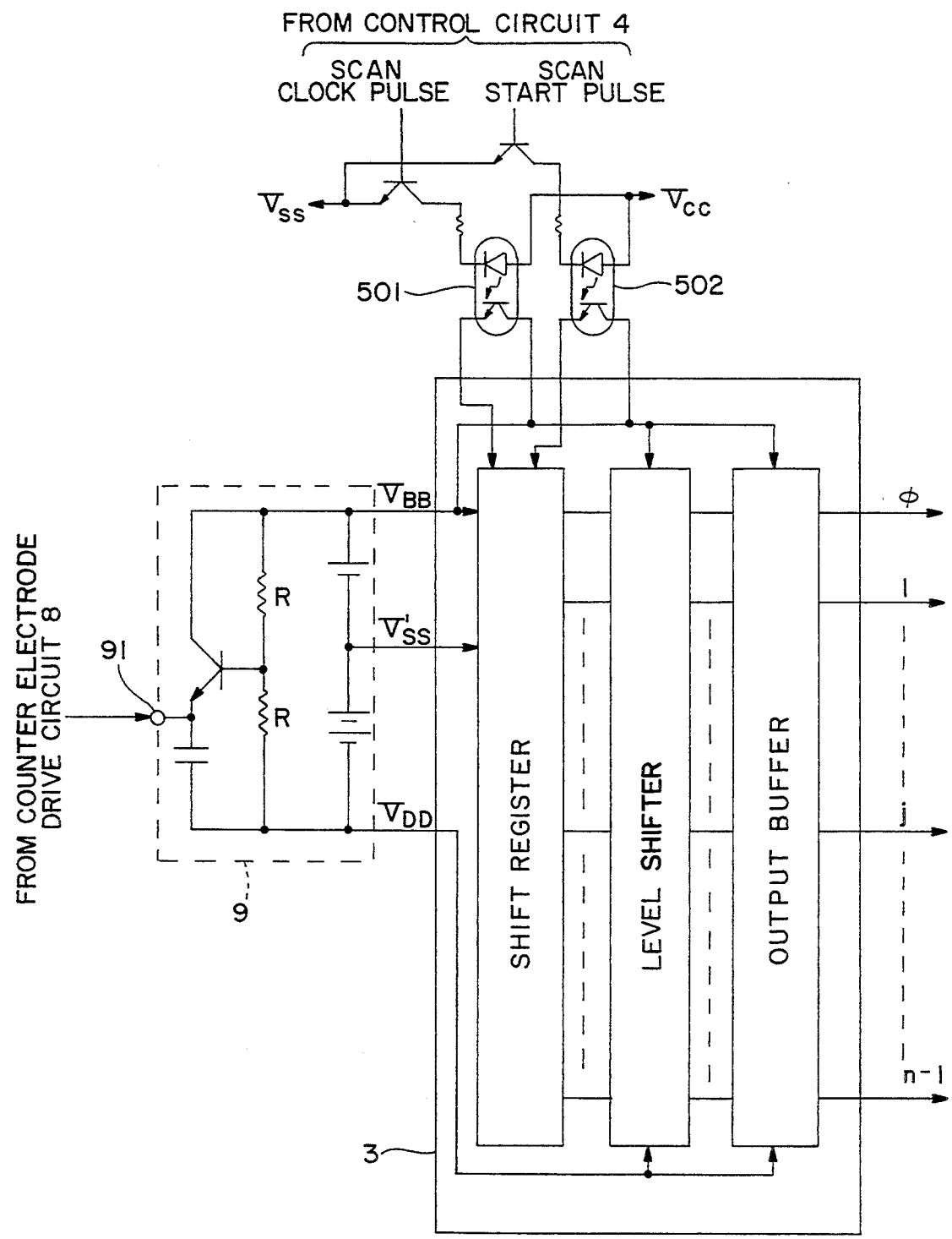
FIG. 16 is a block diagram of a gate driver for the device shown in FIG. 12.

The gate driver 3 will be described by referring to FIG. 16. As described above, the TFT liquid crystal panel 100 is of a so-called CS on-gate type. The supplemental capacitance electrodes 106 are AC-driven through the scanning electrodes 101. Therefore, the gate driver 3 is designed so as to perform a floating operation. Scan clock pulse and scan start pulse which are control signals from the control circuit 4 to the gate driver 3 are supplied via photocouplers 501 and 502. A square wave from the counter electrode drive circuit 8 is impressed on a node 91 of the gate drive power source circuit 9, and a high-level power source voltage $V_{BB}$, a low-level power source voltage $V_{DD}$, and a reference voltage $V'_{SS}$ fluctuate. Therefore, the operating voltage of the gate driver 3 as seen from a common voltage deviates, thereby enabling the AC-drive of the supplemental capacitance electrodes 106 to be performed.

The AC-drive of the counter electrodes 105 and the supplemental capacitance electrodes 106 will be described. The waveforms of AC voltages applied to the signal electrodes 102 and the counter electrodes 105 are shown in (a) and (b) of FIG. 17, respectively, and the waveform of the voltage impressed on the signal electrodes 102 as seen from the counter electrodes 105 is shown in (c) of FIG. 17. In FIG. 17, j−1, j, and j+1 denote the numbers of the selected scanning electrodes 101. The source driver 2 operates on a single +5 V power source (i.e., $V_{CC}=+5$ V, $V_{SS}=0$ V). The center voltage $v_a$ of the AC-drive for the signal electrodes 102, counter electrodes 105 and supplemental capacitance electrodes 106 is 2.5 V. The level of the voltage signals supplied to the source driver 2 from the AC bias circuit 7 are listed in Table 1 below.

TABLE 1

| | |
|---|---|
| $+V_0 = 1.5$ V | $-V_0 = 3.5$ V |
| $+V_1 = 2.0$ V | $-V_1 = 3.0$ V |
| $+V_2 = 2.5$ V | $-V_2 = 2.5$ V |
| $+V_3 = 3.0$ V | $-V_3 = 2.0$ V |
| $+V_4 = 3.5$ V | $-V_4 = 1.5$ V |
| $+V_5 = 4.0$ V | $-V_5 = 1.0$ V |
| $+V_6 = 4.5$ V | $-V_6 = 0.5$ V |
| $+V_7 = 5.0$ V | $-V_7 = 0$ V |

As shown in (a) of FIG. 17, in the AC-drive of the signal electrodes 102, the voltages $-V_0$—$-V_7$ are used for scanning a certain scanning electrode 101, and the voltages $+V_0$—$+V_7$ are used for scanning the adjacent scanning electrode 101. As seen from (b) of FIG. 17, the counter electrodes 105 are AC-driven by the counter electrode drive circuit 8. In this AC-drive, the phase is shifted by 180 degrees from the phase of the AC-drive of the signal electrodes 102. The voltages applied to the counter electrodes 105 are $+\Delta V=5.5$ V and $-\Delta V=-0.5$ V. Therefore, the amplitude of the AC-drive is $\pm 3$ V with respect to the center voltage $v_a$ (2.5 V). The waveform of the voltage as seed from the counter electrodes 105 is shown in (c) of FIG. 17 in which the light transmittance of the liquid crystal elements in the normal white display mode is also shown. As can be seen from FIG. 17, as a result of the AC-drive of the counter electrodes 105, the amplitude of the voltage applied to the signal electrodes 102 appears large as seen from the counter electrodes 105, even though it is actually small.

Figure 18A:
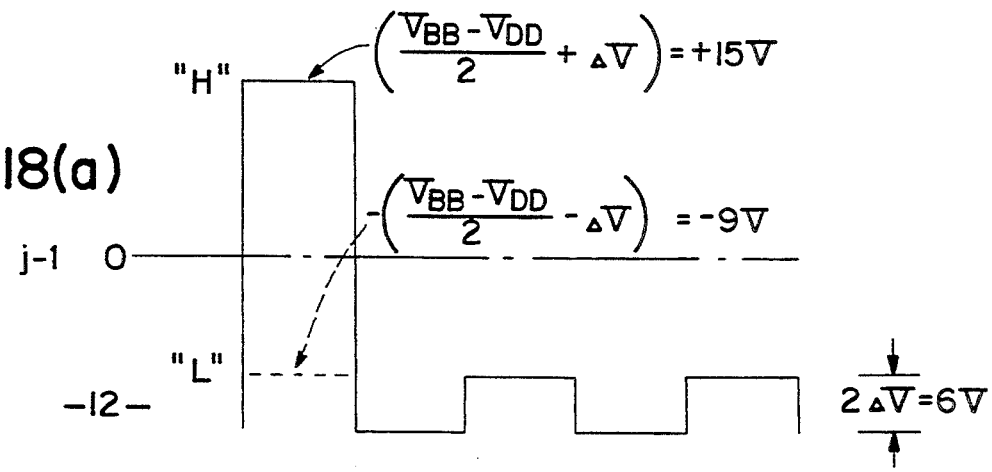
Figure 18B:
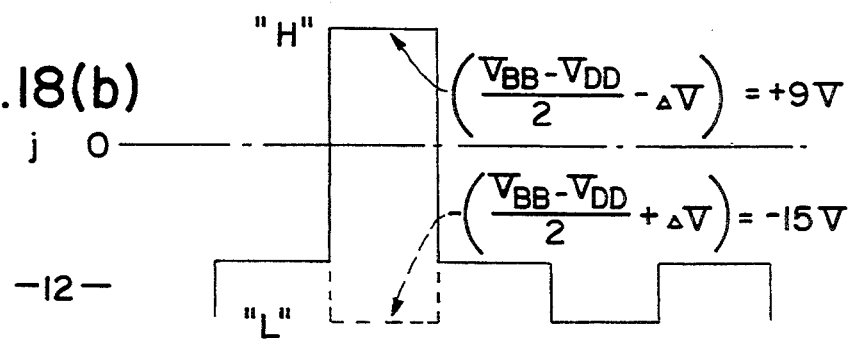
Figure 18C:
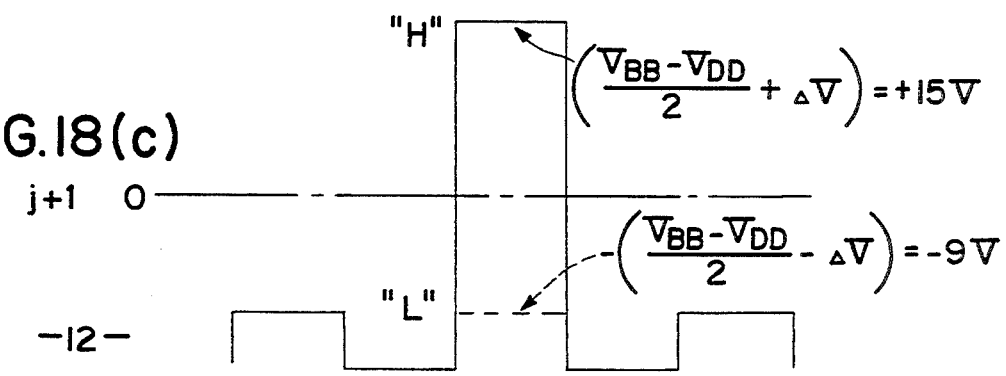

In order to avoid fluctuations in the holding voltage of the liquid crystal elements due to the AC-drive of the counter electrodes 105, voltages as shown in FIG. 18 are applied to the scanning electrodes 101. The voltage applied to the (j−1)th scanning electrode 101 is impressed on the supplemental capacitance electrode 106 corresponding to the jth scanning electrode 101. When the voltage applied to the counter electrodes 105 is $+\Delta V$, the high level of the voltage impressed on the scanning electrodes 101 is $((V_{BB}-V_{DD})/2+\Delta V)$, and the low level is $-((V_{BB}-V_{DD})/2-\Delta V)$. Also, when the voltage impressed on the counter electrodes 105 is $-\Delta V$, the high level is $((V_{BB}-V_{DD})/2-\Delta V)$, and the low level is $-((V_{BB}-V_{DD})/2+\Delta V)$. Here, $V_{BB}-V_{DD}=24$ V. As can be seen from FIG. 18, when a scanning electrode 101 is selected, a high level pulse is supplied to the selected scanning electrode, and during other periods, an AC voltage with the center voltage of −12 V is supplied to the selected scanning electrode.

Figure 19A:
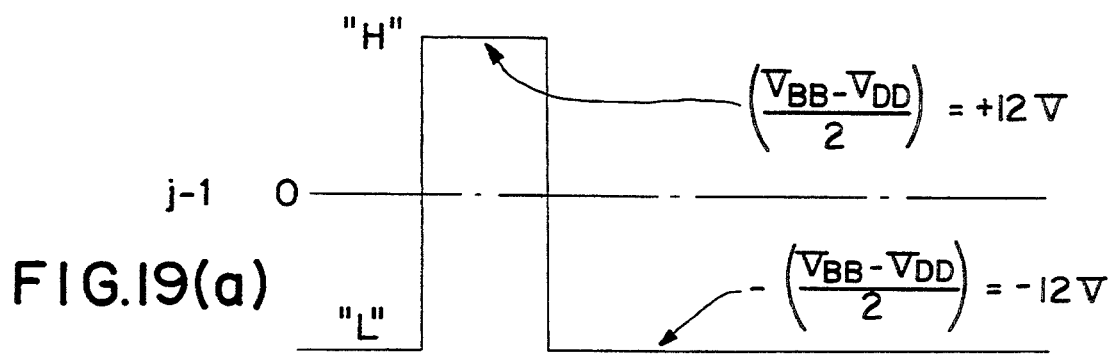
Figure 19B:
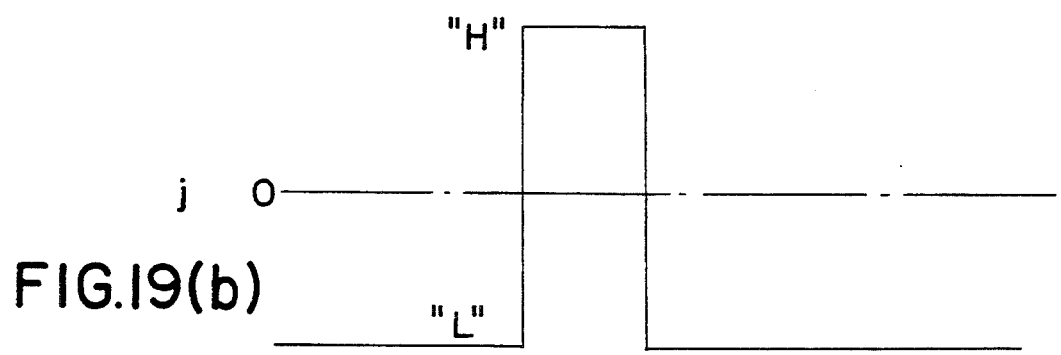
Figure 19C:
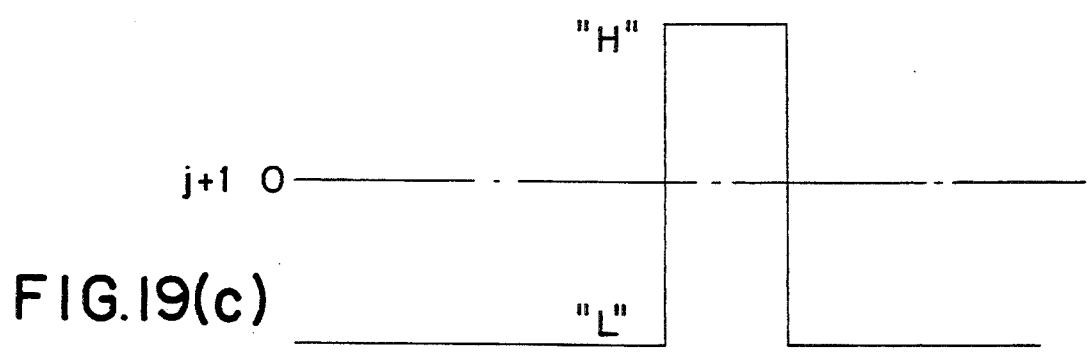

The waveform of the voltage applied to the scanning electrodes 101 as seen from the counter electrodes 105 is shown in FIG. 19.

By performing the AC-drive for driving the supplemental capacitance electrodes 106 via the scanning electrodes 101 with the same phase and amplitude as the counter electrodes 105, the voltage impressed on the signal electrodes as seen from the counter electrodes 105 ((c) of FIG. 17) and the voltage impressed on the scanning electrodes as seen from the counter electrodes 105 (FIG. 19) are completely free from the effect of the AC-drive of the counter electrodes 105, so the conditions are the same as when DC voltages are supplied to the counter electrodes 105.

In the above, an embodiment for driving a CS on-gate type TFT liquid crystal panel was explained. When driving a TFT liquid crystal panel in which the supplemental capacitance electrodes are electrically connected to the counter electrodes, the supplemental capacitance electrodes can be AC-driven in the same way as the counter electrodes by AC-driving the counter electrodes.

The above-described embodiments employ a digital system, but of course the present invention can also be applied to drive devices using a conventional analog system.

EXAMPLE 4

One example of the driving method according to the invention will be described with reference to FIGS. 9–11. The embodiment is the one employed in operating the driving apparatus shown in FIG. 5 (i.e., the second embodiment of the driving apparatus of the invention). It can be seen for those skilled in the art that the driving method of the invention can be applicable also to other driving apparatuses including those shown in FIGS. 1 and 12. In these driving apparatuses, a gray-scale display in which the number of scale levels is determined by the bit number of digital video signals. According to the invention, gray-scale displays having an increased number of scale levels can be realized.

As described above, in the apparatus of FIG. 5, one of the voltage signals $\pm V_k$ (k=0, 1, ..., 7) is selected based on the value of 3-bit digital input video signals, and the selected voltage signal is applied to the corresponding signal electrode 102. Therefore, eight-level gray-scale corresponding to the voltage signals $\pm V_k$ is obtained. This eight-level gray-scale is referred to as "standard gray-scale." When the standard gray-scale corresponding to the voltage signal $\pm V_5$ for a pixel contained in the jth horizontal scanning line is to be obtained, for example, the video signal with the value for selecting the voltage signal $\pm V_5$ is input to the source driver 2 as the input digital video signal corresponding to said pixel, and the voltage signal $\pm V_5$ is sent to the signal electrode corresponding to said pixel in the jth horizontal scanning period of each frame.

Figure 9:
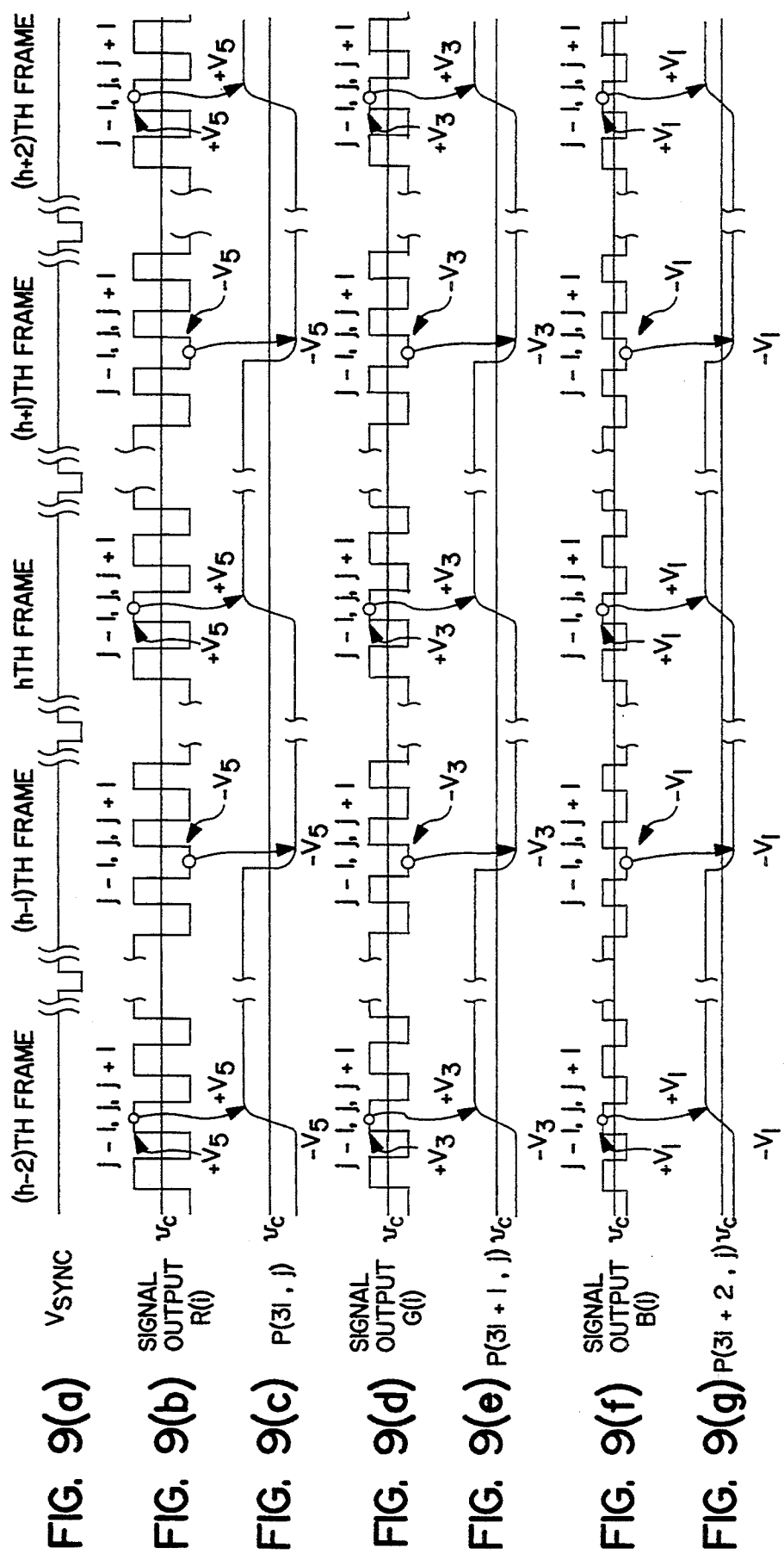
FIG. 9 is a timing chart showing the display timing for obtaining the standard gray scale in the display apparatus of FIG. 5.
Figure 10:
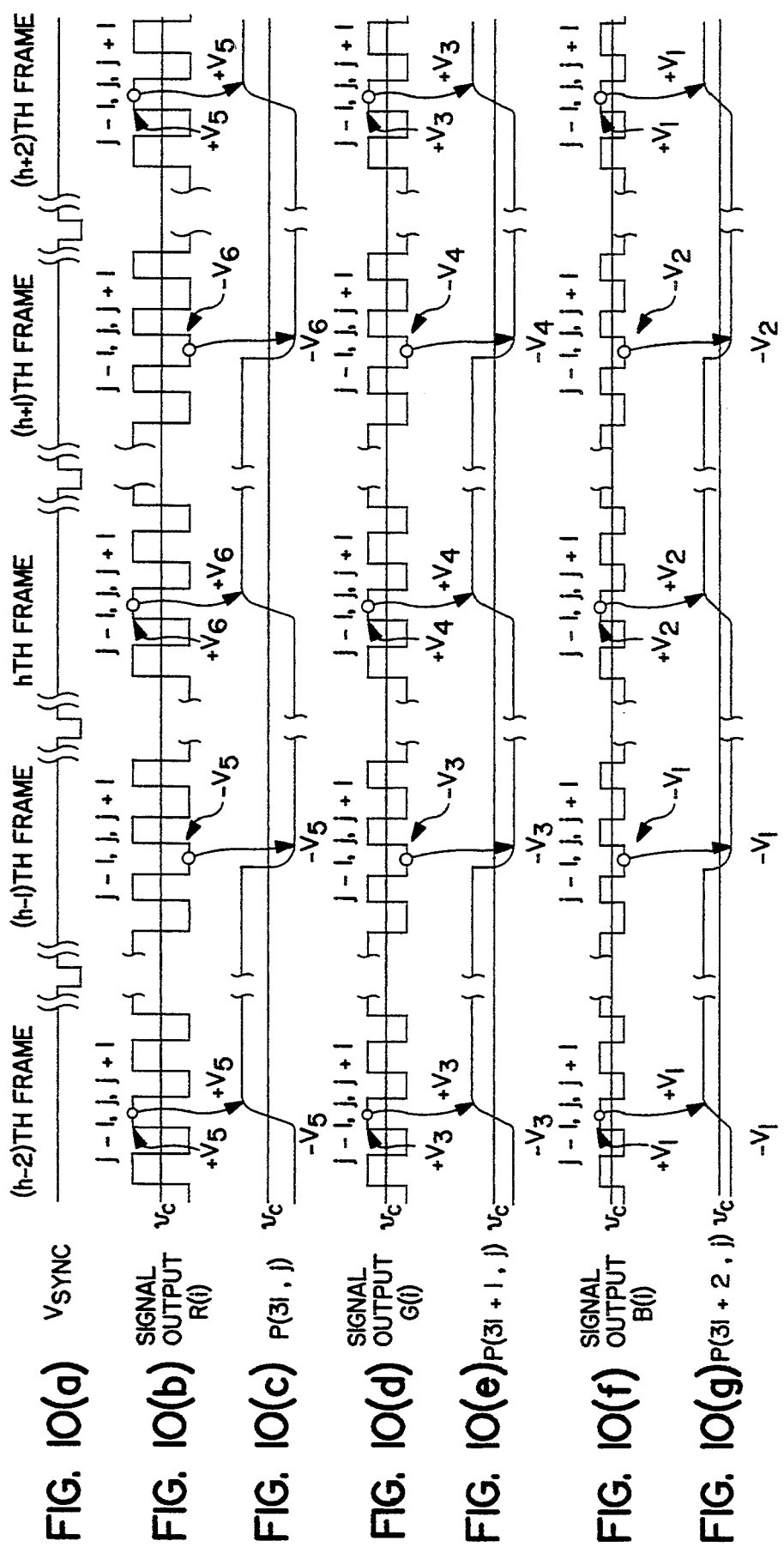
FIG. 10 is a timing chart showing the display timing for obtaining intermediate gray-scale levels in the display apparatus of FIG. 5.

FIG. 9 shows an example of the display timing used to obtain standard gray-scale. In FIG. 9 and in FIG. 10 mentioned below, j−1, j and j+1 denote the horizontal scanning periods or the horizontal scanning line numbers, and 3i, 3i+1, and 3i+2 denote the numbers of the signal electrodes 102. P indicates the waveform of the voltage applied to a pixel.

In order to obtain a gray-scale for a pixel contained in the jth horizontal scanning line which scale is between the gray-scale corresponding to the voltage signal $\pm V_5$ and the gray-scale corresponding to the voltage signal $\pm V_6$, the video signal with the value for selecting the voltage signal $\pm V_5$ is input in the jth horizontal scanning period in the (h−2)th and (h−1)th frames to the source driver 2 as the digital video signal input corresponding to said pixel, and in the hth frame and (h+1)th frame following the above-mentioned frames, the video signal with the value for selecting the voltage signal $\pm V_6$ is input to the source driver 2. In the succeeding frames, the drive is the same as in the (h−2)th to (h+1)th frames. As a result of such a drive, the averaged voltage level $\pm V_{ave}$ of the voltage signals which are sent to the signal electrodes 102 over four frames becomes $$\pm V_{ave} = \{\pm V_5 \times 2 + (\pm V_6) \times 2\}/4 \quad (1)$$
$$= \pm (V_5 + V_6)/2$$

whereby an intermediate gray-scale corresponding to the voltage level between the level of the voltage signal $\pm V_5$ and the level of the voltage signal $\pm V_6$ is obtained. An example of the display timing used to obtain an intermediate gray-scale is shown in FIG. 10.

Generally, in order to obtain a desired gray-scale in the liquid crystal display apparatus in FIG. 5, digital video signals are supplied to the source driver 2 so that the voltage signals $\pm V_k$ and $\pm V_{k+1}$ are selected respectively in the number of times shown below as F number (F=2p, where p is an integer 1 or greater) of frames. That is, the voltage signal $\pm V_k$ is selected 2 (p−q) times (where q is an integer 0 or greater and q $\leq$ p), and
the voltage signal $\pm V_{k+1}$ is selected 2q times.

By performing the present drive method, the voltage level $\pm V_{ave}(q/p)$ obtained by averaging the levels of voltage signals sent to the signal electrodes 102 over 2p number of frames is expressed by the following.

$$\pm V_{ave}(q/p) = \pm \{V_k + (q/p)(V_{k+1} - V_k)\} \quad (2)$$

When q=0, a standard gray-scale corresponding to one of the voltage signals $\pm V_k$ is obtained, and when q $\neq$ 0, a desired intermediate gray-scale equivalent to the voltage level between the level of the voltage signal $\pm V_k$ and the level of the voltage signal $\pm V_{k+1}$ can be obtained.

In the present method, the standard gray-scale is eight levels of gray-scale corresponding to the voltage signal levels $\pm V_0$, $\pm V_1$, $\pm V_2$, $\pm V_3$, $\pm V_4$, $\pm V_5$, $\pm V_6$ and $\pm V_7$, but by performing ½ averaged drive where p=2 and q=1, further seven intermediate gray-scale levels equivalent to $\pm(V_0+V_1)/2$, $\pm(V_1+V_2)/2$, $\pm(V_2+V_3)/2$, $\pm(V_3+V_4)/2$, $\pm(V_4 + V_5)/2$, $\pm(V_5+V_6)/2$ and $\pm(V_6+V_7)/2$ can be obtained, thus realizing a total of 15 gray-scale levels when combined with the above-mentioned standard gray-scale levels.

Figure 11:
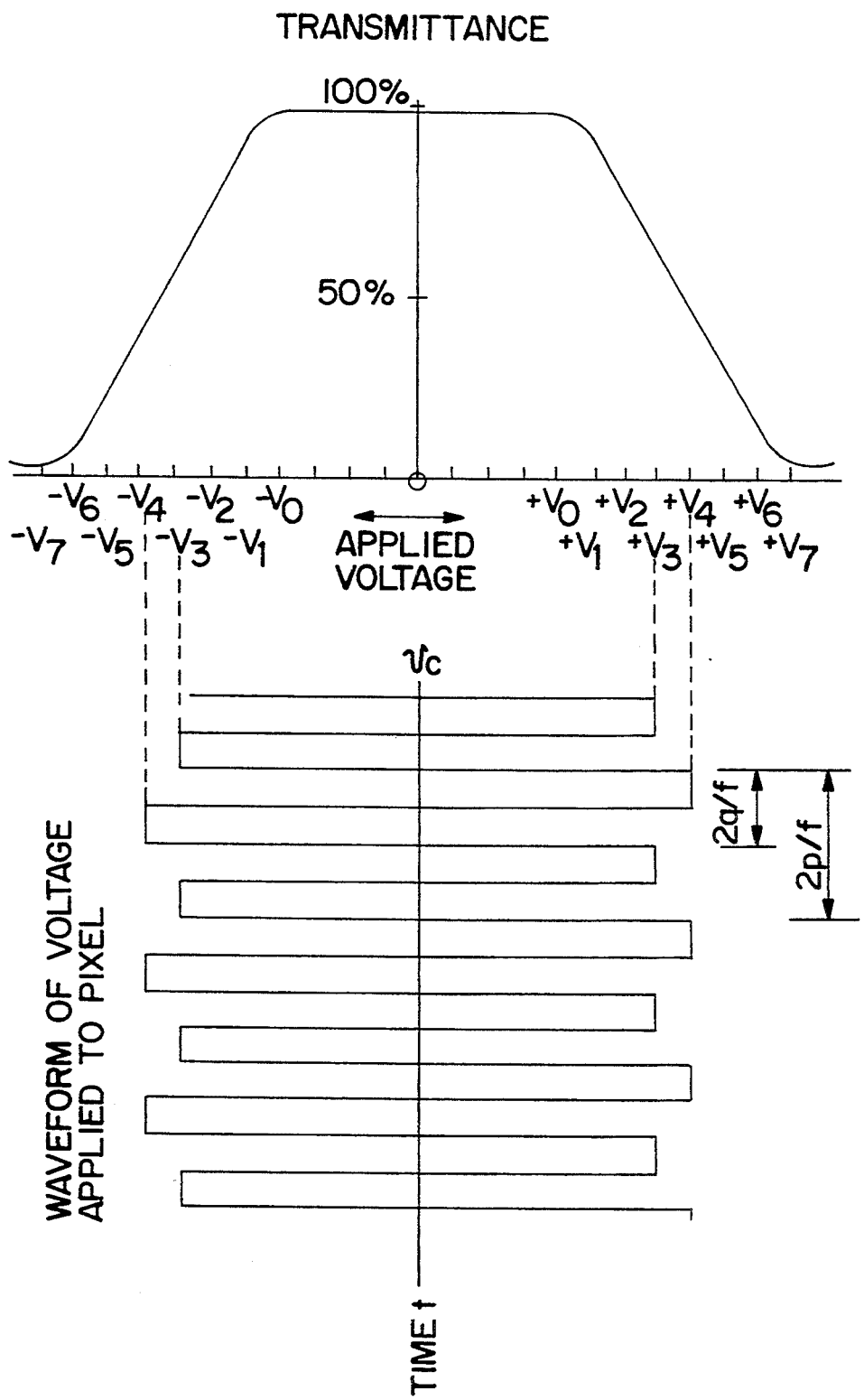
FIG. 11 shows the relationship between a voltage applied to a pixel and light transmittance in the normal white display mode.

FIG. 11 shows the relationship between the voltages applied to a pixel and the light transparency of the pixel when a normal white liquid crystal display mode is used. As shown in FIG. 11, the applied voltage vs. light transparency of the pixel shows linearity, so that, when using this linear part, good intermediate gray-scale can be obtained by means of averaged drive. FIG. 11 also shows the waveform of the applied voltage with respect to the pixel when averaged drive is performed using voltage signals $\pm V_3$ and $\pm V_4$.

When the present drive method is applied to the display apparatus of a personal computer, for example, the control device for the display apparatus of the personal computer may be given the function to perform the ½ averaged drive described above.

Averaged drive which uses two voltage signals $\pm V_k$ and $\pm V_{k+1}$ with adjacent voltage levels can be considered to be the ideal drive method for obtaining intermediate gray-scale levels. However, the drive method of this invention is not limited to the above-mentioned embodiment, and can also be applied to drive of other types, for example, one in which two voltage signals the voltage levels of which are not adjacent, and one in which three or more voltage signals are used.

Further, display apparatuses to which the drive method of this invention can be applied are not limited to display apparatus with the drive device described in the above-described ones. The present drive method can be applied to any display apparatus having a drive device with a means for converting an input digital signal to one of a certain number of multiple level voltage signals.

According to the invention, a drive device for a display apparatus is offered which solves the various problems which are involved in prior art drive devices in which the analog video signal sampling method is used.

In the drive device of this invention, digitized video signals are stored, and then transferred. Therefore, deterioration of the frequency characteristic of video signals due to the sampling time constant, which is a problem in analog video signal sampling type drive devices of the prior art, can be avoided. Further, amplitude attenuation due to charge distribution between the sampling capacitor and the holding capacitor also does not occur.

In the drive device of this invention, a process is performed mainly on digital signals, and operation of the various parts in the device can be thoroughly synchronized. Therefore, a shift in the display position of the image and image bleeding due to delays, etc., occurring in the circuitry can be suppressed, thus greatly improving the display accuracy and display quality of the image. These advantages are highly effective in a high fidelity display of high-definition image data, so that even computer graphics can be accurately displayed.

The drive device of this invention can accommodate display panels with increased capacity by basically speeding up the logic circuits constituting the memory circuit which stores input digital video signal. In an embodiment of the invention, the video signal memory circuit is capable of storing video signals for at least one horizontal scanning, so the D/A conversion of the stored digital video signals can be performed relatively slowly by utilizing the next horizontal scanning period. This not only contributes to lowering the cost of the drive device, but it also improves display accuracy.

In another embodiment this invention, the number of bits of input digital video signals necessary to obtain a certain number of gray-scale levels can be reduced, and therefore the number of bus lines for inputting video signals can be reduced.

In a still other embodiment of this invention, the amplitude of the voltage impressed on the signal electrode for obtaining the prescribed voltage between the pixel electrodes and counter electrodes can be made small by using AC-drive to drive the counter electrodes. Consequently, the operating voltage of intermediate-voltage parts in the signal electrode drive system of the prior art can be lowered, thus making it possible to speed up the signal electrode drive system, to raise the level of integration, to reduce production costs and to lower power consumption. Further, it also becomes possible to operate the signal electrode drive system on a single power source. In addition, speeding up the signal electrode drive system makes it possible to process high bit rate video signals, and therefore a drive device capable of driving large-capacity display devices can be realized.

According to the drive method of this invention, gray-scale levels are not restricted by the number of voltage signal levels provided in a display apparatus with a drive device of the digital video signal input type.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In a drive device for driving a display apparatus having a display unit, said display unit including a plurality of signal electrodes arranged in juxtaposition and at least one counter electrode, said drive device comprises:
  a voltage signal supply means for outputting a plurality of voltage signals with different levels, said plurality of voltage signals having alternately positive and negative levels with respect to an AC reference voltage applied to said counter electrode, said AC reference voltage being approximately 180 degrees out-of-phase with said plurality of voltage signals; and
  a signal electrode drive means for selecting one of said plurality of voltage signals in accordance with an input digital video signal, and for supplying said selected voltage signal to one of said signal electrodes.

2. A drive device according to claim 1, wherein each of the periods of said positive level and periods of said negative level corresponds to one horizontal scanning period, and the relationship between the levels in horizontal scanning periods during one frame is inverted in corresponding horizontal scanning periods during the frame following said one frame.

3. A drive device according to claim 1, wherein said signal electrode drive means comprises:
  a video signal memory means for storing said input digital video signal;
  a data decoding means for decoding information contained in said digital video signal which is stored in said memory means; and
  a selection means for selecting one of said plurality of voltage signals in accordance with the output of said data decoding means, and supplying said selected voltage signal to one of said signal electrodes.

4. A drive device according to claim 3, wherein said data decoding means for decoding information receives color information for color signals of red, green and blue from an R memory, a G memory and a B memory respectively.

5. In a drive device for driving a display apparatus having a display unit, said display unit including: a plurality of signal electrodes arranged in juxtaposition; a plurality of scanning electrodes intersecting said signal electrodes; a plurality of pixel electrodes which are disposed respectively at the intersections of said signal electrodes and said scanning electrodes; at least one counter electrode opposing said pixel electrodes; and supplemental capacitance electrodes for forming capacitors in cooperation with said pixel electrodes, said drive device comprises:
  a voltage applying means for applying an AC voltage to said counter electrode;
  a signal electrode drive means for AC-driving said signal electrodes, the level of the AC voltage varying and having phases which are in-phase or approximately 180 degrees out-of-phase from that of said AC voltage applied to said counter electrode; and
  a supplemental capacitance electrode drive means for applying an AC voltage to said counter electrode and driving said supplemental capacitance electrodes including a drive means composed of said voltage applying means, the drive of said supplemental electrodes being in phase of said AC voltage.

6. A drive device according to claim 5, wherein said drive device further comprises a voltage signal supply means for outputting a plurality of voltage signals with different levels, said plurality of voltage signals having alternately positive and negative levels with respect to said reference voltage, and
  said signal electrode drive means comprises a supply means for selecting one of said plurality of voltage signals in accordance with an input digital video signal, and supplying said selected voltage signal to one of said signal electrodes.

7. A drive device according to claim 5, wherein said supplemental capacitance electrodes correspond respectively to predetermined ones of said scanning electrodes, and each of said supplemental capacitance electrodes is electrically connected to said scanning electrodes other than said predetermined scanning electrodes.

8. A drive device according to claim 5, wherein said supplemental capacitance electrodes are electrically connected to said counter electrode.

9. A drive device according to claim 5, wherein said drive device further comprises a scanning electrode drive means for driving said scanning electrodes, said scanning electrode drive means operating in a floating state, and wherein supplemental capacitance electrode drive means applies an AC voltage to said supplemental capacitance electrodes which oscillates in phase with the AC voltage applied to said counter electrodes by connecting said supplemental capacitance electrode driver means to said counter electrodes.

10. A drive device according to claim 5, wherein said signal electrode drive means is powered by a single power source.

* * * * *

UNITED STATES PATENT AND TRADEMARK OFFICE
CERTIFICATE OF CORRECTION

PATENT NO. : 5,414,443
DATED : May 9, 1995
INVENTOR(S) : Y. Knatani, et al

It is certified that error appears in the above-indentified patent and that said Letters Patent is hereby corrected as shown below:

Column 14, lines 4-5:
READS: "$R_0(i-)-R_2(i)$", SHOULD READ --$R_0(i)-R_2(i)$--;

column 17, line 53:
READS: "$\pm(V_4 \pm V_5)/2$", SHOULD READ --$\pm(V_4+V_5)/2$--.

Signed and Sealed this

Eighth Day of August, 1995

Attest:

BRUCE LEHMAN

*Attesting Officer*    *Commissioner of Patents and Trademarks*